(12) United States Patent
Rowohlt

(10) Patent No.: US 7,958,685 B2
(45) Date of Patent: Jun. 14, 2011

(54) CROWN EXTRUSION

(76) Inventor: Todd Rowohlt, Freehold, NJ (US)

( * ) Notice: Subject to any disclaimer, the term of this patent is extended or adjusted under 35 U.S.C. 154(b) by 0 days.

(21) Appl. No.: 12/559,629

(22) Filed: Sep. 15, 2009

(65) Prior Publication Data

US 2010/0058690 A1 Mar. 11, 2010

Related U.S. Application Data

(60) Provisional application No. 61/097,084, filed on Sep. 15, 2008.

(51) Int. Cl.
E04F 19/04 (2006.01)
E04B 2/00 (2006.01)

(52) U.S. Cl. .............. 52/287.1; 52/288.1; 52/718.04

(58) Field of Classification Search ............... 52/287.1, 52/288.1, 718.04; 362/151
See application file for complete search history.

(56) References Cited

U.S. PATENT DOCUMENTS

| | | | | |
|---|---|---|---|---|
| 1,229,765 A | * | 6/1917 | Lehman | 52/288.1 |
| 1,250,594 A | * | 12/1917 | Knapp | 52/288.1 |
| 1,825,010 A | * | 9/1931 | Hayes | 52/288.1 |
| 3,018,530 A | | 1/1962 | Pender, Sr. | |
| 3,635,787 A | * | 1/1972 | Shanok et al. | 428/167 |
| 4,052,830 A | * | 10/1977 | Smith | 52/288.1 |
| 4,530,865 A | * | 7/1985 | Sprenger | 428/35.7 |
| 4,534,147 A | * | 8/1985 | Cristell | 52/288.1 |
| 5,001,877 A | * | 3/1991 | Edwards | 52/288.1 |
| 5,199,237 A | * | 4/1993 | Juntunen | 52/287.1 |
| 5,226,724 A | * | 7/1993 | Kanarek | 362/260 |
| 5,359,817 A | * | 11/1994 | Fulton | 52/288.1 |
| 5,426,901 A | * | 6/1995 | Indracek | 52/288.1 |
| 5,433,048 A | * | 7/1995 | Strasser | 52/288.1 |
| 5,457,923 A | * | 10/1995 | Logan et al. | 52/288.1 |
| 5,638,643 A | * | 6/1997 | Demartini et al. | 52/11 |
| 5,651,224 A | * | 7/1997 | Brabant | 52/288.1 |
| 6,557,311 B1 | * | 5/2003 | Mongelli | 52/288.1 |
| 6,918,977 B1 | | 7/2005 | Maurer | |
| 7,210,272 B2 | * | 5/2007 | Friday | 52/288.1 |
| 7,645,051 B2 | * | 1/2010 | Schultz | 362/145 |
| 7,696,434 B2 | * | 4/2010 | Ruddick | 174/68.3 |
| 2001/0045076 A1 | * | 11/2001 | Boomer | 52/716.1 |
| 2006/0196144 A1 | * | 9/2006 | Spek | 52/720.1 |
| 2006/0277853 A1 | * | 12/2006 | Dillon | 52/287.1 |
| 2007/0119107 A1 | * | 5/2007 | Shaw et al. | 52/287.1 |
| 2007/0271865 A1 | * | 11/2007 | Rowohlt | 52/287.1 |
| 2008/0092470 A1 | * | 4/2008 | Jackson | 52/288.1 |
| 2008/0229690 A1 | * | 9/2008 | Sharabi | 52/288.1 |

FOREIGN PATENT DOCUMENTS

EP 0 227 342 * 1/1987
GB 2 191 518 A * 12/1987

OTHER PUBLICATIONS

International Search Report dated Nov. 3, 2009 corresponding to International PCT Application No. PCT/US2009/056922 filed Sep. 15, 2009.

* cited by examiner

*Primary Examiner* — Robert J Canfield
(74) *Attorney, Agent, or Firm* — Stroock & Stroock & Lavan LLP

(57) ABSTRACT

A decorative molding system and method of installation is provided that has a base piece and a crown piece that are adapted to be selectively engageable to each other. The molding system is easy to construct and allows for the separation of the base piece and crown piece for placing wiring or other materials behind the molding.

12 Claims, 24 Drawing Sheets

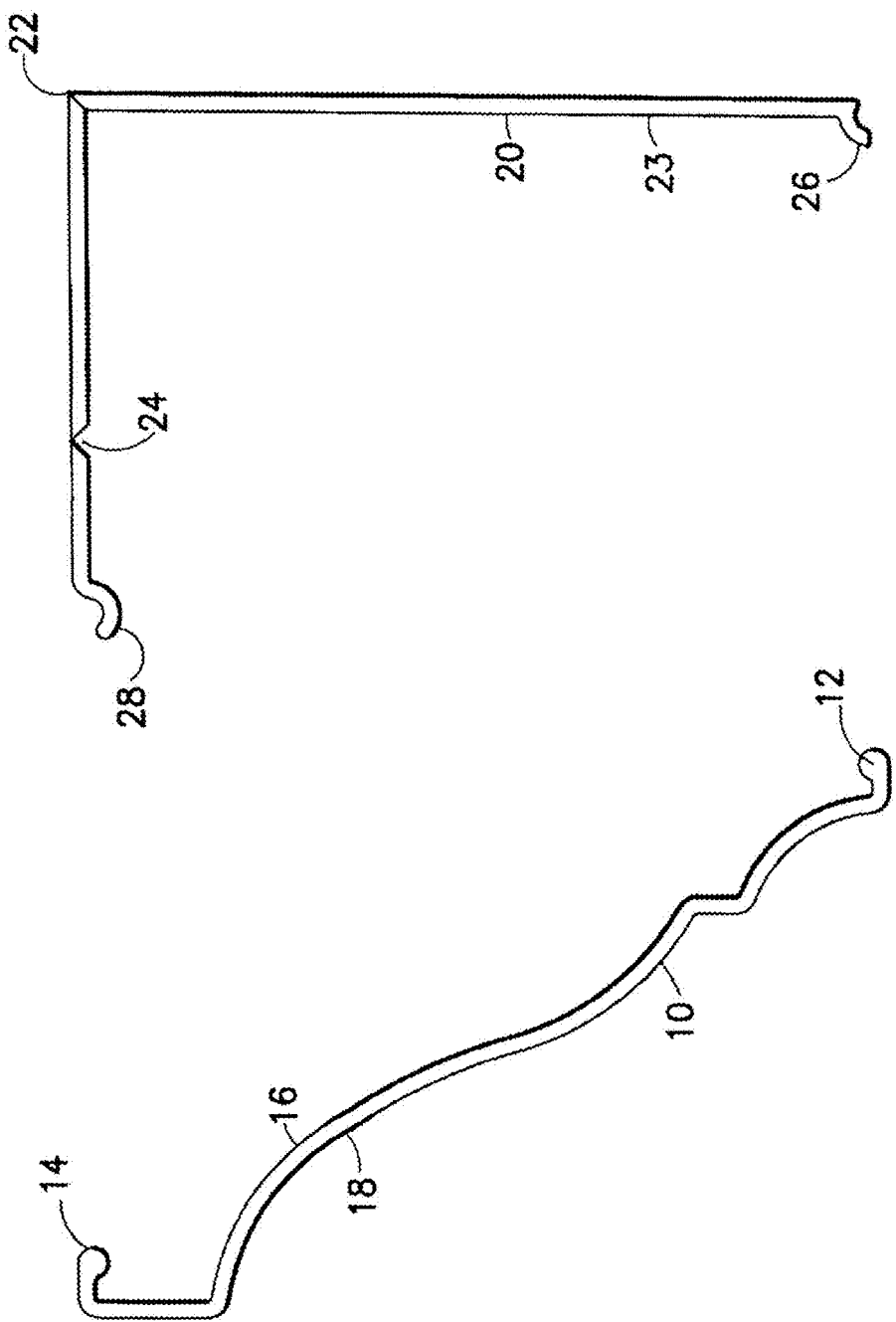

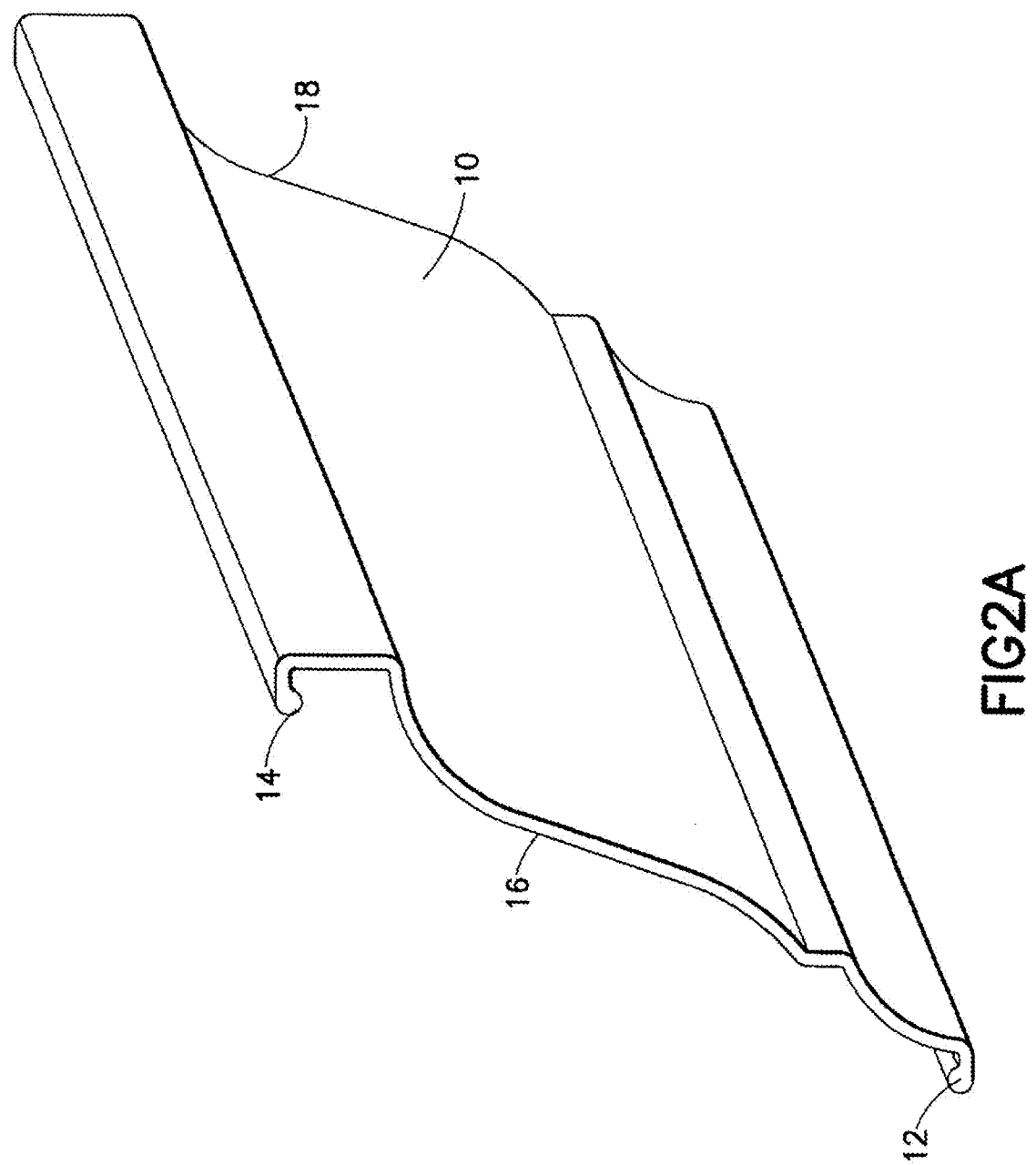

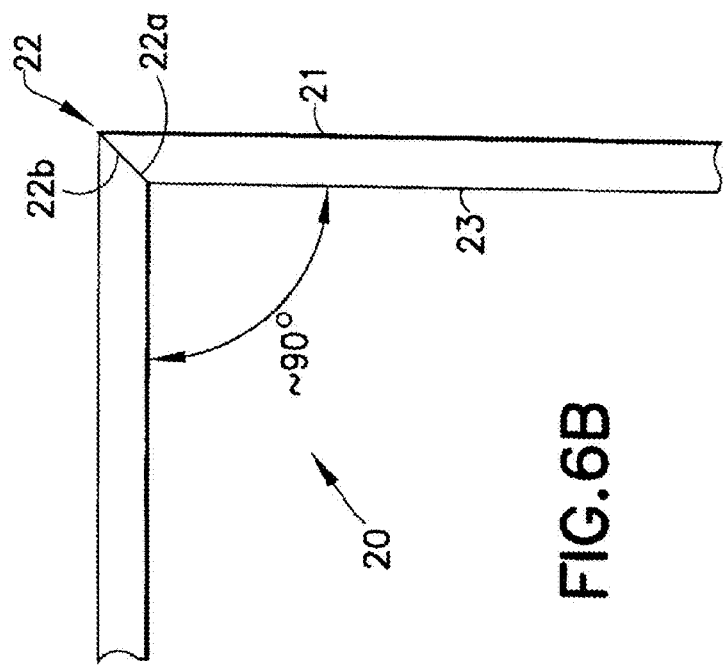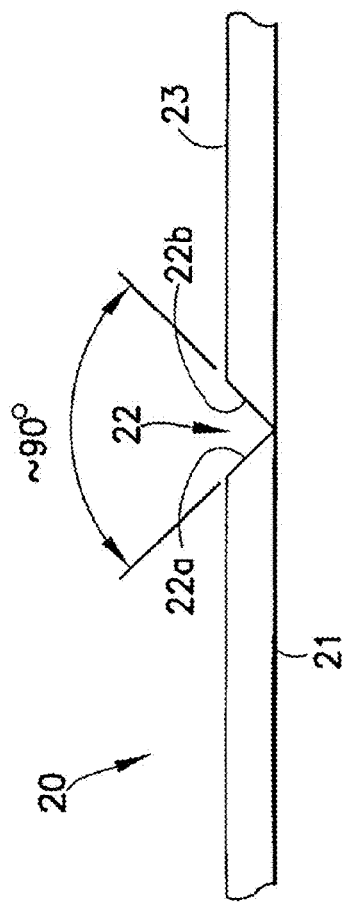
FIG. 6B
FIG. 6A

CROWN EXTRUSION

CROSS-REFERENCE TO RELATED APPLICATION

This application claims the benefit of now abandoned U.S. application Ser. No. 11/800,269, filed May 3, 2007, and U.S. Provisional Application Ser. No. 61/097,084, filed Sep. 15, 2008, entitled "Crown Extrusion," the entire disclosure of each of which is hereby incorporated by reference.

BACKGROUND OF THE INVENTION

1. Field of the Invention

The present invention relates to the field of decorative moldings and, in particular, to a selectively removable crown molding system.

2. Description of Related Art

Applying "crown molding" is the process by which a decorative molding is applied to the top edge of walls, cabinets, or other furniture. The process of applying crown molding is typically done along the seams where a ceiling meets a vertical wall. Generally speaking, crown molding is difficult to apply because it is applied at an angle defined by an inside edge on the backside of the crown molding and either the ceiling or the vertical wall. These pairs of angles are typically on the order of 55-degrees by 35-degrees, 52-degrees by 38-degrees, or 45-degrees by 45-degrees. As such, extremely precise cutting and positioning of the molding needs to be made in order to achieve an installation that looks clean and professional.

In typical crown molding parlance, the wall surface behind the molding is referred to the rise and the ceiling surface behind the molding is referred to the run. With reference to FIG. 11 (prior art), a cross-sectional view of a piece of crown molding abutting the wall and ceiling surfaces is shown. Wall surface 1110 is the rise and ceiling surface 1112 is the run. Surface 1120 is the decorative surface of the molding and surface 1122 is the rear-facing, non-visible surface of the molding. Two edge surfaces 1124, 1126 sit flush on the ceiling and wall, respectively. Nails 1140 are driven into the wall and ceiling as necessary to fit the molding in place.

With this background, the process of applying crown molding requires positioning the crown molding so that one edge surface 1126 sits flush on a vertical wall and another edge surface 1124 sits flush on the ceiling. As such, the crown molding spans and covers the seam 1130 between the vertical wall and the ceiling. Because wall and ceiling structures in most homes are uneven in that the surfaces of a vertical wall and ceiling do not create a 90-degree angle, the problems associated with installation of crown moldings are exacerbated. Moreover, room corners, where two vertical walls meet a ceiling, require complex "compound miter" cuts requiring both a bevel cut and a miter cut, or difficult to apply coping cuts. In order to carry out such cutting, a great deal of experience and expensive and complicated tools such as compound miter saws, coping saws, or air-driven or battery powered finish nailers are needed in order to effectively install the crown molding. These conditions make the prospect of installing crown molding both daunting and expensive for an average homeowner requiring expertise that most "do-it-yourself" homeowners do not possess. Therefore, there is a need for a crown molding system, and process of applying such crown molding, that allows a user to relatively easily apply crown molding without having a great deal of woodworking experience, or without requiring the use of expensive or complicated tools.

Additionally, in traditional crown molding systems, the crown molding is attached using nails, screws, glue, or other attachment means designed to permanently attach the crown molding to the wall and ceiling surfaces. With the increase of wired technologies permeating the home environment, such as wiring for home theaters and wired Ethernet networks, there is an increased need for minimally invasive wiring options that eliminate or reduce the need for in-wall wiring. Because traditional crown molding is permanently mounted, opportunities for wiring in the space behind crown molding are generally limited to pre-installation wiring. Because media, theater, or network components, for example, may be added or deleted by choice or as new products become available, there is a desire and need for removable crown moldings that permit post-installation wiring options. The various embodiments of the present invention satisfy the foregoing, as well as other needs.

SUMMARY OF THE INVENTION

In an embodiment of the present invention, a decorative molding system and method of installation includes a pair of removably engagable molding components. Specifically, a base piece includes a run member hingeably connected to a rise member, such that an approximately 90-degree angle can be created between the run and rise members. Each of the run and rise members include an engagement hook at their respective ends. The base piece is mounted to vertical wall and ceiling surfaces by attaching the run member to the ceiling and the rise member to the wall, such that the hinge portion connecting the run and rise members sits approximately in the intersection between the vertical wall and ceiling. A molding piece having a decorative surface generally of a profile known in the art for crown moldings includes upper and lower engagement surfaces. Each of the upper and lower engagement surfaces includes a protrusion for engagement with the engagement hooks on the base piece. In this way, the molding piece can be removably engaged to the base piece to give an appearance similar to traditional crown molding, but with an ease of installation unavailable with traditional crown molding.

In this embodiment, the base piece and crown piece are removably engagable to each other and can be flush mounted to the ceiling. In another embodiment, the system is adapted to provide mounting that is not flush with the ceiling for decorative and visual effect, and possibly to be combined with a secondary visual element. In this embodiment, the hinge connecting the run and rise members is designed such that its rotation about an axis passing through the hinge will not rotate substantially past a point creating an angle smaller than approximately 90-degrees between the run and rise members. As such, the base piece can be fixed to a vertical wall via the rise member without attachment of the run member such that the molding can be attached to provide a space between the ceiling and top of the molding. The base piece may further include vents or a channel in the surface of the run member enabling the routing of accent lighting.

In yet another embodiment, either or both of the base and crown pieces can be provided in a form, such as but not limited to a roll, that enables a user of the system to cut the respective pieces required for a specific length to avoid splicing together separate pieces to cover a given wall space. In this embodiment, the system may be extruded or formed using plastic so that it can be coiled or rolled during the forming process. Therefore, the user is not limited to any specific length or span and the need for "splicing" two spans together is rendered obsolete. The base piece of the system may be mounted to a wall or ceiling surface using any of a number of fasteners, including but not limited to nails, screws, adhesives, adhesive tapes, and the like. The base piece may also include at one or more secondary hingeable portions disposed on either or both of the run and rise members to facilitate bending of the base piece to conform to the contour of the juncture of a wall and ceiling thereby improving installation on walls and ceilings that may be out of square.

Additionally, in some embodiments, the crown molding systems are significantly lighter as a result of the thickness of the crown profile and the materials from which the molding pieces are formed. Furthermore, in accordance with at least one embodiment, the system requires only a standard utility knife and fastener. Specifically, the ends of the crown piece can be mitered using a utility knife to form the corners.

Crown molding is manufactured in many different styles, shapes and dimensions; while a standard style is illustrated herein, and those skilled in the art will recognize the present invention applies to crown moldings of all conceivable styles, shapes and dimensions (whether milled from wood, extruded from plastic materials or molded from plastic materials). The materials used in its manufacturing can range from wood, plastic, fiberglass, clay, plaster and any others known to those having skill in the art.

In yet another embodiment of the present invention, a decorative molding system and method of installation includes a pair of removably engagable molding components. Specifically, a base piece includes a run member hingeably connected to a rise member, such that an approximately 90-degree angle can be created between the run and rise members. Each of the run and rise members include an engagement member at their respective ends. The base piece is mounted to vertical wall and ceiling surfaces by attaching the run member to the ceiling and the rise member to the wall, such that the hinge portion connecting the run and rise members sits approximately in the intersection between the vertical wall and ceiling (although the base piece may be moved a distance away from the ceiling to create a desired artistic effect). A molding piece having a decorative surface generally of a profile known in the art for crown moldings includes upper and lower engagement surfaces. The upper engagement surface preferably includes a protrusion for engagement with an engagement hook on the run member of the base piece. In contrast to earlier embodiments, however, the lower engagement surface of the crown piece preferably includes a tab member extending substantially vertically for engagement with a tension clasp portion of the run member of the base piece. In this way, the molding piece can be removably engaged to the base piece to give an appearance similar to traditional crown molding, but with an ease of installation unavailable with traditional crown molding.

In an alternate embodiment of a corner piece, the corner piece is provided with tabs inwardly offset from a back wall of the corner piece. Additionally, additional material is provided at a lower portion of the back wall of the corner piece to permit custom adjustment of the corner piece to fit in a corner that is not exactly 90-degrees. In a preferred embodiment, the additional material is configured as a pair of wings extending outwardly at an approximately 5-degree angle from the back corner of the corner piece. This preferred configuration permits a corner piece to be adapted to a corner that has an angle that is greater than 90-degrees, but less than approximately 100-degrees. Persons of skill in the art will recognize that these angles can be adjusted to meet certain design criteria.

Additional features and advantages of the present invention are described further below. This summary section is meant merely to illustrate certain features of the embodiments of the inventions, and is not meant to limit the scope of the invention in any way. The failure to disclose a specific feature or embodiment of the invention, or the inclusion of one or more features in this summary section, should not be construed to limit the invention as claimed.

BRIEF DESCRIPTION OF THE DRAWINGS

A further understanding of the present invention can be obtained by reference to the embodiments set forth in the illustrations of the accompanying drawings. The drawings are not intended to limit the scope of this invention but merely to clarify and be illustrative of embodiments of the invention.

FIG. 2 depicts a crown piece in accordance with an embodiment of the present invention;

FIG. 2A depicts an extruded profile view of the crown piece shown in FIG. 2 in accordance with an embodiment of the present invention;

FIG. 3 depicts a base piece in accordance with an embodiment of the present invention;

FIGS. 6A and 6B depict expanded side views of a base piece in accordance with one embodiment of the present invention;

DETAILED DESCRIPTION OF THE CERTAIN EMBODIMENTS

Figure 1:
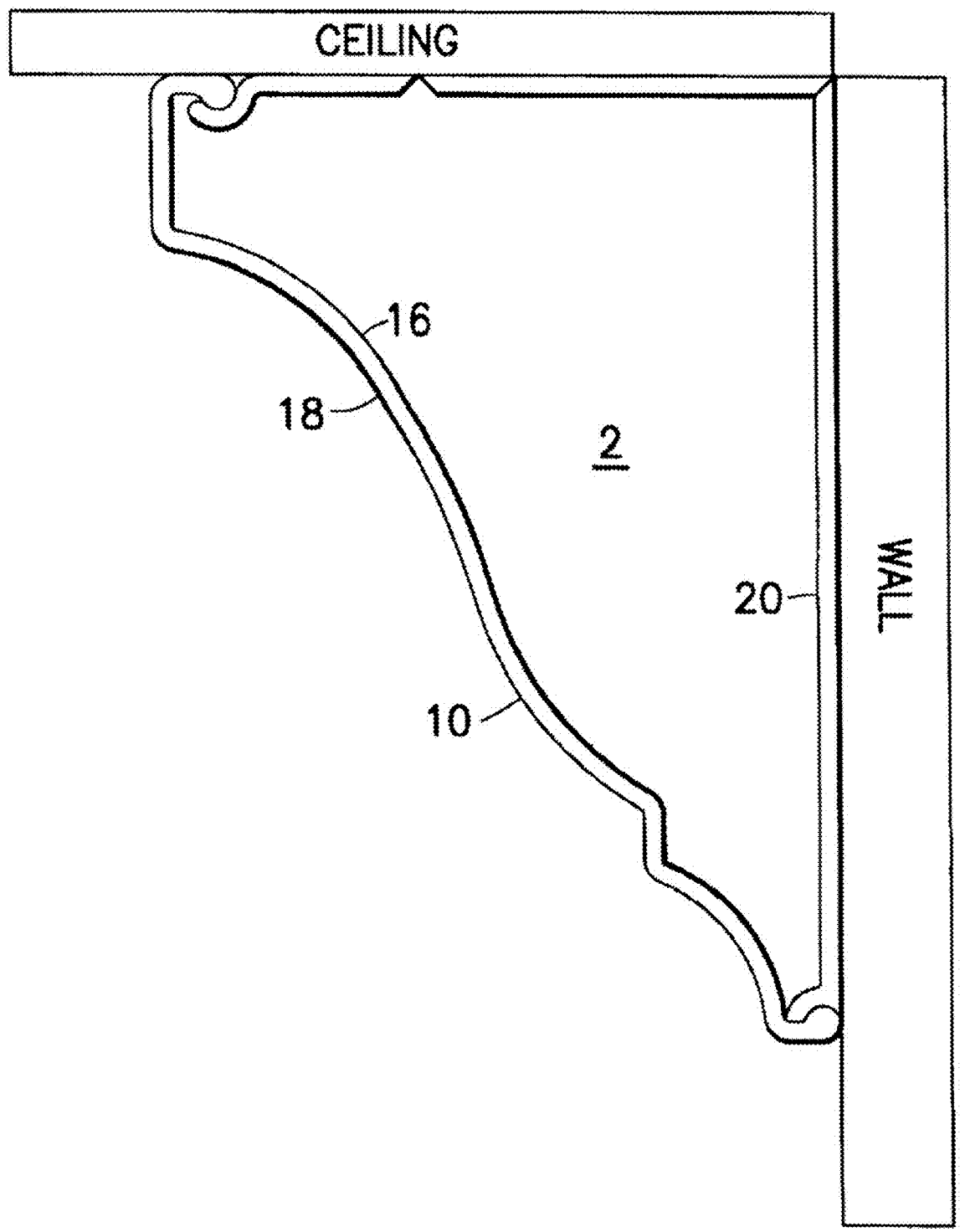
FIG. 1 depicts a device in accordance with an embodiment of the present invention.

The present invention generally relates to a decorative molding system and a process of installing such a system, along with certain secondary decorative or functional items.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention.

Certain embodiments of the present invention will now be discussed with reference to the aforementioned figures, wherein like reference numerals refer to like components. It should be noted that reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

Now referring to FIGS. 1-10, in accordance with various embodiments of the present invention, a crown molding system 2 includes at least a crown piece 10 and base piece 20. Crown piece 10 preferably has a decorative profile (as shown at least in FIG. 1). Crown piece 10 generally includes bottom and top attachment devices 12 and 14, respectively, base facing surface 16 and front surface 18. Base piece 20 includes bottom and top attachment devices 26 and 28 for engagement to attachment to devices 12 and 14. Base piece 20 may comprise a fixed L-shape adapted to fit the contour of a ceiling-wall juncture, or may be provided with a hingeable portion 22 and/or 24 for adapting a flat base piece 20 to conform to such a contour. Hingeable portions 22 or 24 may be formed in any way known to those having skill in the art, such as but not including by a score line formed in a plastic or resin sheet that facilitates bending of the sheet at the score line, or weakening the portion of the base piece 20 to be hinged. In an embodiment, the hinge can be oriented such that open wedge portion of the hinge is in a ceiling facing position, as opposed to the orientation of hinge 22. In another embodiment, where the material of the base piece is a harder material, such as wood, base piece 20 can comprise two separate pieces, one for contacting a wall and the other for contacting a ceiling, joined by a hinge. In an embodiment in which the system is engineered from PVC plastics, the system is adapted to be coiled or rolled during the extrusion process. In such embodiments, user is not limited to any specific length or span and the need for "splicing" two spans together is obsolete, as further described below.

Figure 3A:
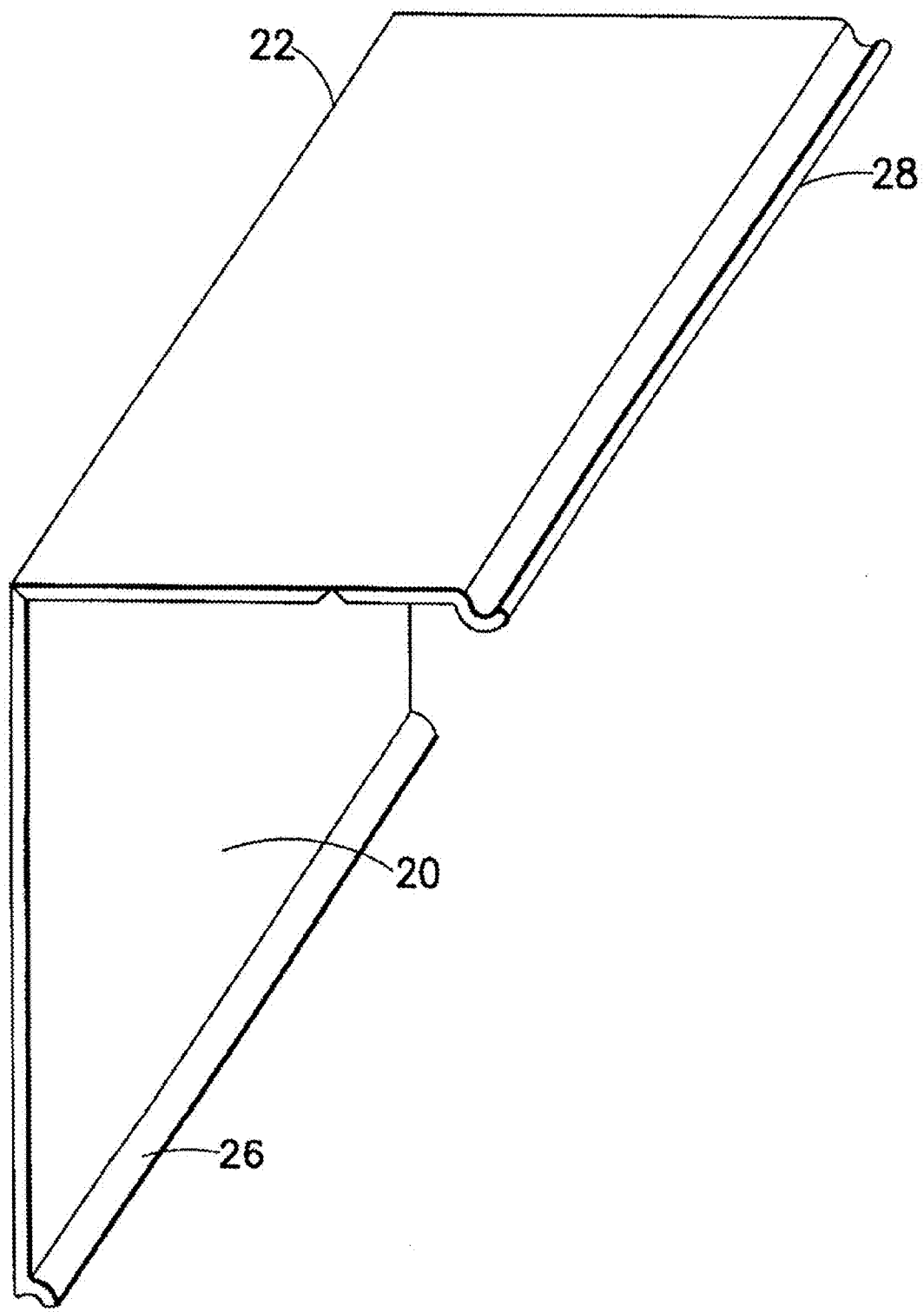
FIG. 3A depicts an extruded profile view of the base piece shown in FIG. 3 in accordance with an embodiment of the present invention.

FIGS. 2A and 3A show an extruded profile view of the crown piece 10 and base piece 20 shown in FIGS. 2 and 3, respectively. As can be seen in FIG. 2A, a crown piece contains bottom attachment device 12 which connects to attachment device 26 of base piece 20 (shown in FIG. 3A) and top attachment device 14 which connects to attachment device 28 of base piece 20 (shown in FIG. 3A). Attachment devices 12 and 14 can comprise a bead for engaging attachment devices 26 and 28 of base piece 20, which comprise hooks or sockets, forming a pressure fit ball and socket type engagement. The opposite arrangement (not shown) can also be employed wherein sockets 26 and 28 are formed on molding piece 10 and beads 12 and 14 are formed on base piece 20. Other attachment embodiments for the present invention include tab-slot arrangements and any other suitable attachment arrangement known to those having skill in the art. In an embodiment of the present invention, beads 12 and 14 are releasably attachable to sockets 26 and 28.

Figure 5:
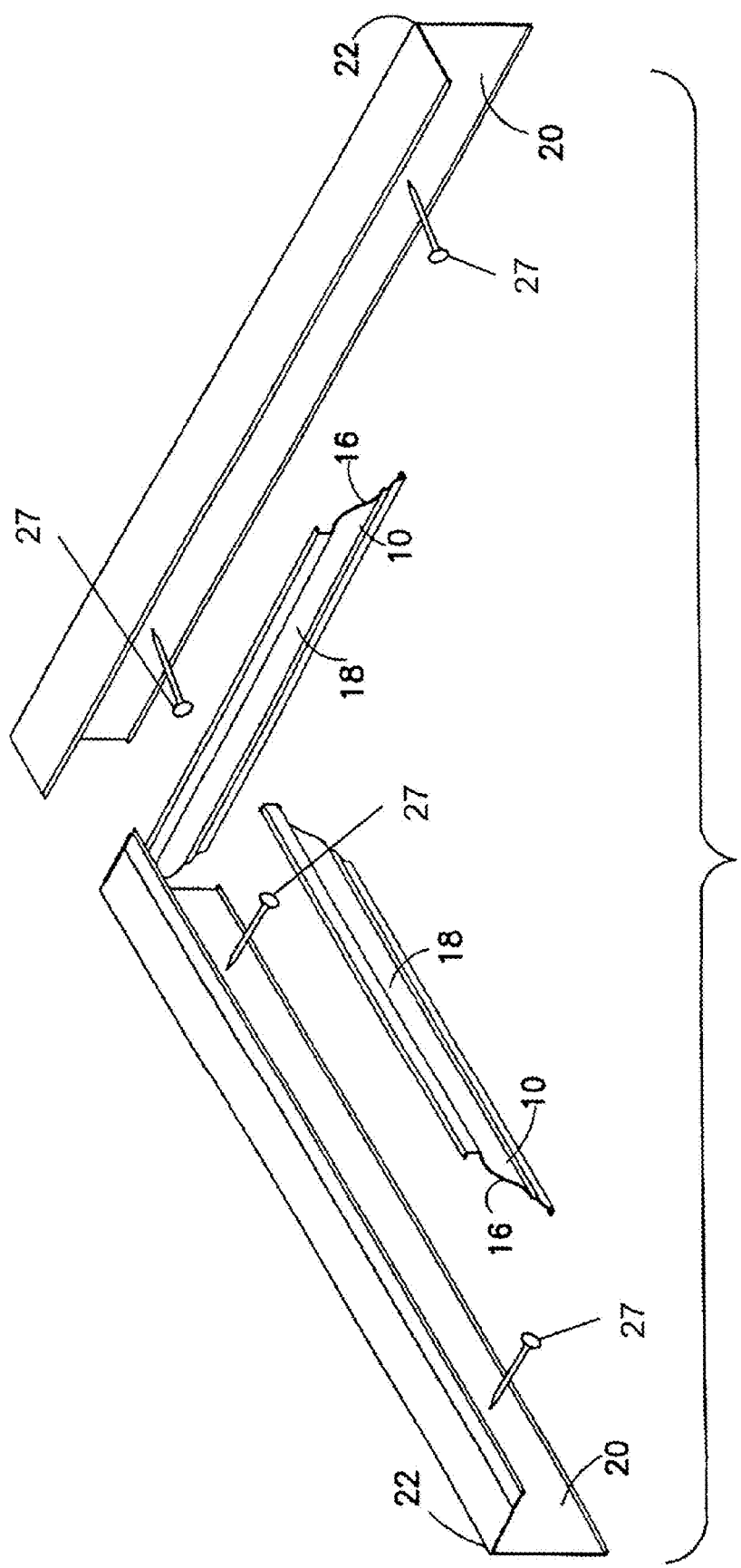
FIG. 5 depicts a system in accordance with an embodiment of the present invention.
Figure 6:
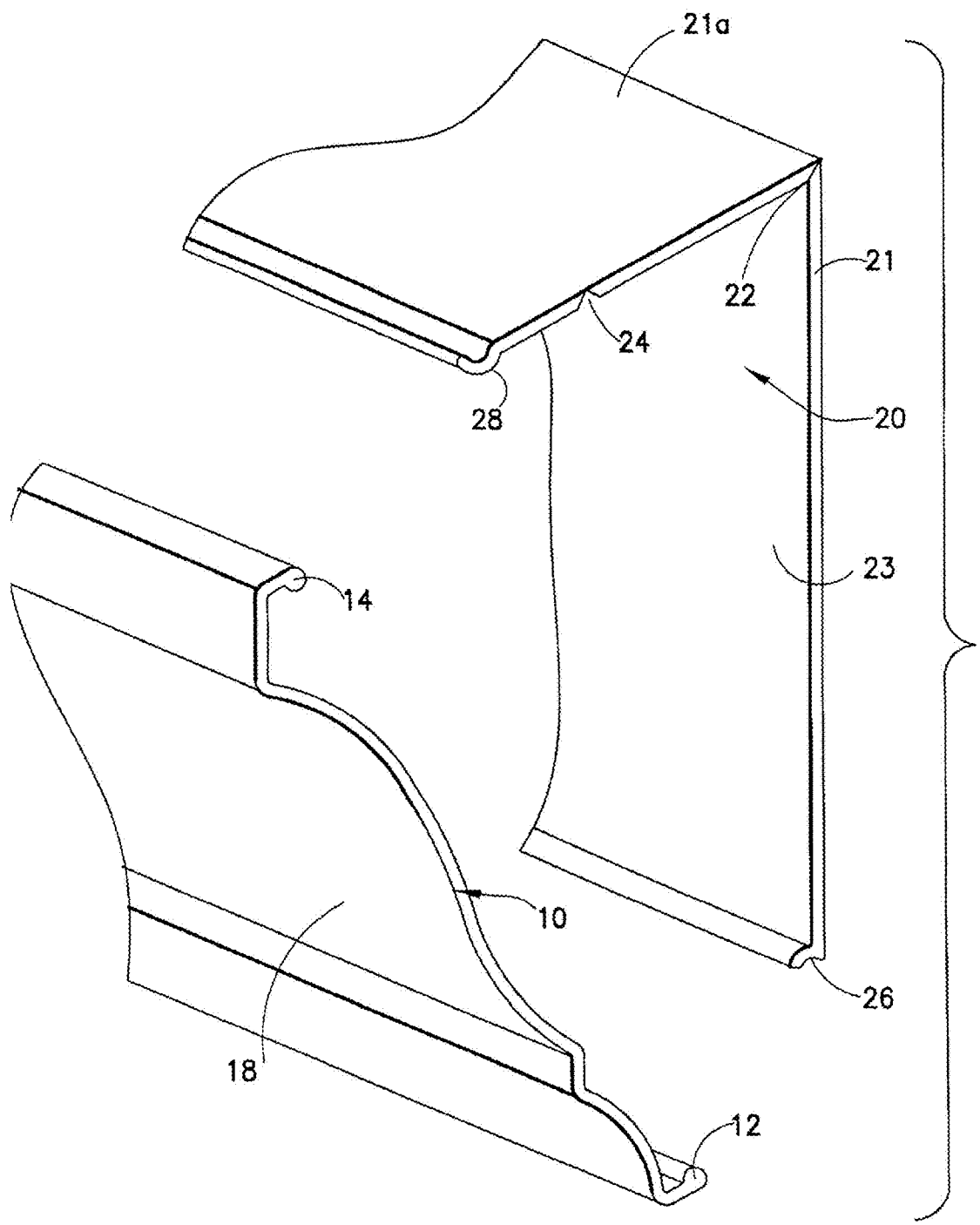
FIG. 6 depicts a system in accordance with an embodiment of the present invention.

As can be seen in FIGS. 5 and 6, base piece 20 is adapted to be fastened flush to a wall and either flush mounted to a ceiling or positioned below and away from the ceiling surface. In an embodiment, as shown in FIG. 6, back portion 21 of base piece 20 includes hinge 22. As further shown in the expanded view of FIG. 6A, hinge 22 is preferably formed as a generally triangular slot in face 23 of base piece 20. The slot includes faces 22a and 22b, which are preferably separated when base piece 20 is laid open, as shown in FIG. 6A, by an angle of approximately 90-degrees. As such, when base piece 20 is rotated to be positioned on a wall surface, faces 22a and 22b are each rotated approximately 45-degrees such they contact one another preventing the angle between the rise and run of base piece 20 from rotating to an angle more acute than approximately 90-degrees, as shown in FIG. 6B. This feature advantageously provides additional support to base piece 20 when being mounted in a position that is not flush with a ceiling.

It should be understood that although a triangular profile for the slot of hinge 22 is preferred, other profiles may be used consistent with present invention. It should also be recognized that devices and systems in accordance with the present invention may be employed in homes, offices, restaurants and the like wherever it is desirable to have crown molding. The present inventions may be employed with hard fixed ceiling structures, with standard drop ceilings, or placed partially up a wall not abutment with a ceiling for decorative purposes.

With reference back to FIG. 6, the system of the present invention may also include lighting disposed between the portion 21a of base piece 20 and a ceiling. Lighting may comprise rope lighting, fluorescent light fixtures or other light fixtures (not limited to fluorescent) of any color, as well as decorative lighting, which may include colors or effects for ornamentation purposes. It should be appreciated that because the system is comprised of a base piece which is fastened to a wall, and a crown piece which is in turn secured to the base piece, the crown piece is preferably adapted to be removable, allowing a user the option to use the combination of the base piece and crown piece as a non-combustible housing or conduit for various wires (i.e. electrical, telephone, speaker, cable/satellite etc.). While the figures depict a "two" piece "system," with regard to the base and crown pieces, additional decorative pieces as desired by the user to can be installed onto the crown piece to enhance the look of the molding once assembled.

Figure 6C:
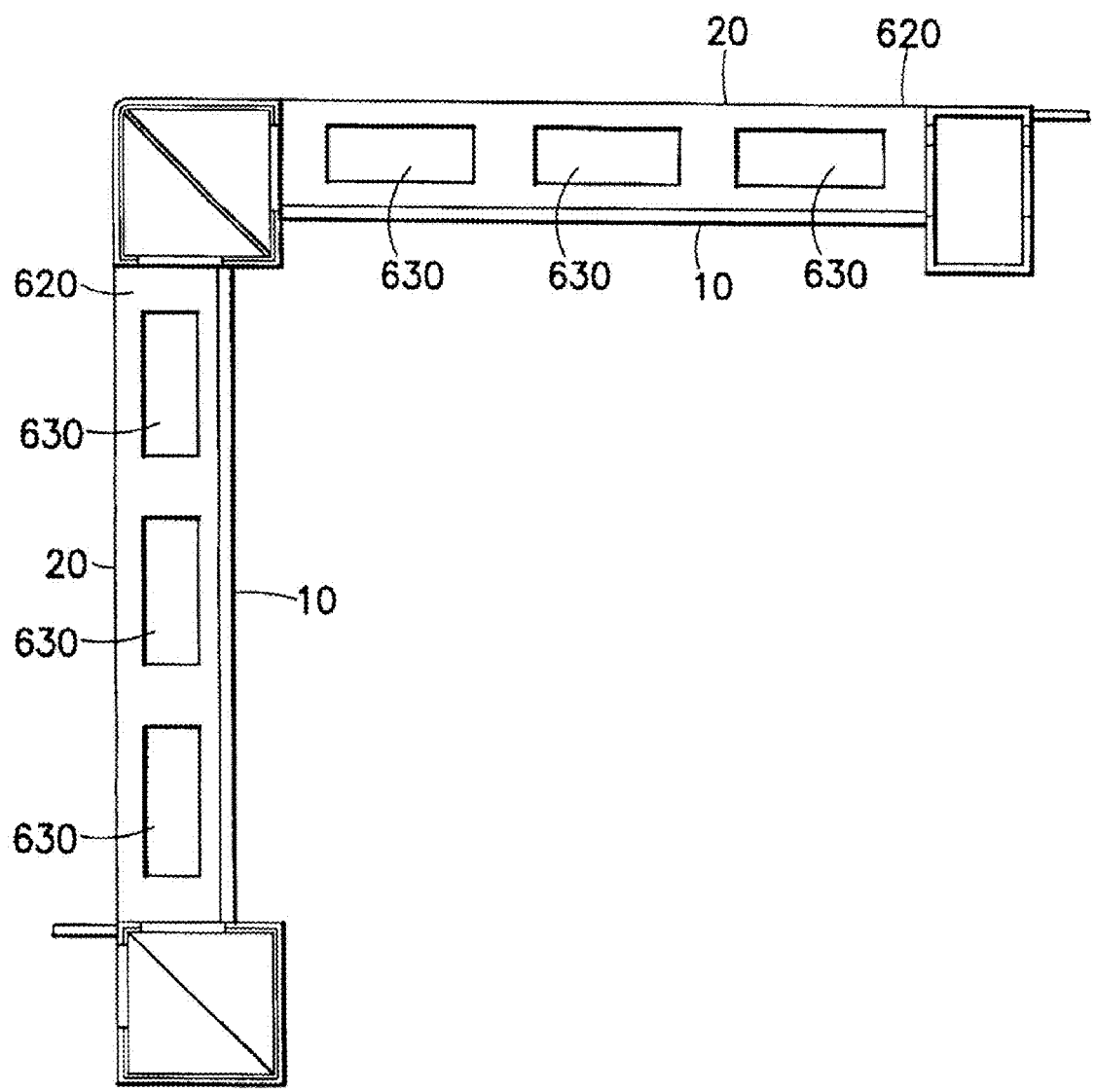
FIG. 6C depicts an expanded view of a hinge on a base piece in accordance with one embodiment of the present invention.

In an alternate embodiment, as shown in FIG. 6C, the run 620 of base piece 20 may include one or more openings 630 such that lighting can be routed in the space formed between the base piece 20 and crown piece 10, as opposed to being positioned above run 620, as shown in FIG. 6. Openings 630 are preferably of sufficient size and number as to allow an even distribution of light to emanate out of the top of the base piece. Openings are preferably generally oval in shape and sized so as to retain the structural rigidity of the run of base piece 20. How large openings 630 may be made relative to the width of run 620 is dependent in large part of the material used to form base piece 20. Alternatively, openings 630 may be covered by a light diffuser including a plurality of light reflecting facets, such as the plastic material commonly found on fluorescent light housings. In addition, base piece 20 may be formed from a translucent material so as to avoid the need for openings.

Illustrative materials from which the pieces of the system may be made include but are not limited to acrylic, polymer, plastic, wood, metal, rubber and composite materials similar to what is employed for example in TREX™ decking material. In a preferred embodiment, materials employed for the crown 10 and base 20 pieces are PVC. In an embodiment, additives such as but not limited to pigments, dyes, "sparkling" elements, iridescent elements and the like may be added to the material employed as is well known to those having skill in the art in the fabrication of the devices in accordance with the present invention for ornamental effect. The additives may be added to provide patterns, such as but not limited to faux marble patterns. The devices in accordance with the invention can be provided with varying degrees of translucency. In other embodiments, devices can be provided with matte or textured surfaces to enhance the three dimensional appeal of the device.

Illustrative fasteners include but are not limited to staples, screws, nails, adhesives, adhesive tapes such as but not limited to double-sided adhesive tapes and other fasteners suited for fastening decorative materials to walls as are well known to those having skill in the art.

In an embodiment of the present invention, base piece 20 is provided in a roll of a desired length; preferably of sufficient length to mount molding on the walls of a room in single lengths. As shown in FIG. 5, base piece 20 is bent along hinge 22 to approximately 90-degrees to fit the space between a ceiling and wall in a flush mount application. Base piece 20 is then fastened onto a wall using fasteners 27 which can include staples, nails, screws, adhesive, adhesive tape or the like. Crown piece 10 may likewise be provided in roll form extruded from plastic and cut to a desired length. It is preferable to cut the crown piece 10 to substantially the same length as base piece 20, and more preferable to a length substantially the same as the length of the wall being covered. However, skilled artisans will recognize there may be some applications wherein the respective lengths of the crown 10 and base 20 pieces are not identical. Crown piece 10 may then be attached to the base piece using the attachment devices 12, 14, 26 and 28, the ends of the crown piece 10 may be mitered using a utility knife to form the corners.

The installation process of installing crown molding using corner pieces 700, according to an embodiment of the present invention, will now be discussed in more detail. When installing the crown molding whether flush to the ceiling or below the ceiling, an inside corner piece 700, as shown in FIG. 7, and outside corner piece 800, as shown in FIG. 8, can be used to avoid the need to miter the ends of crown piece 10.

Figure 7:
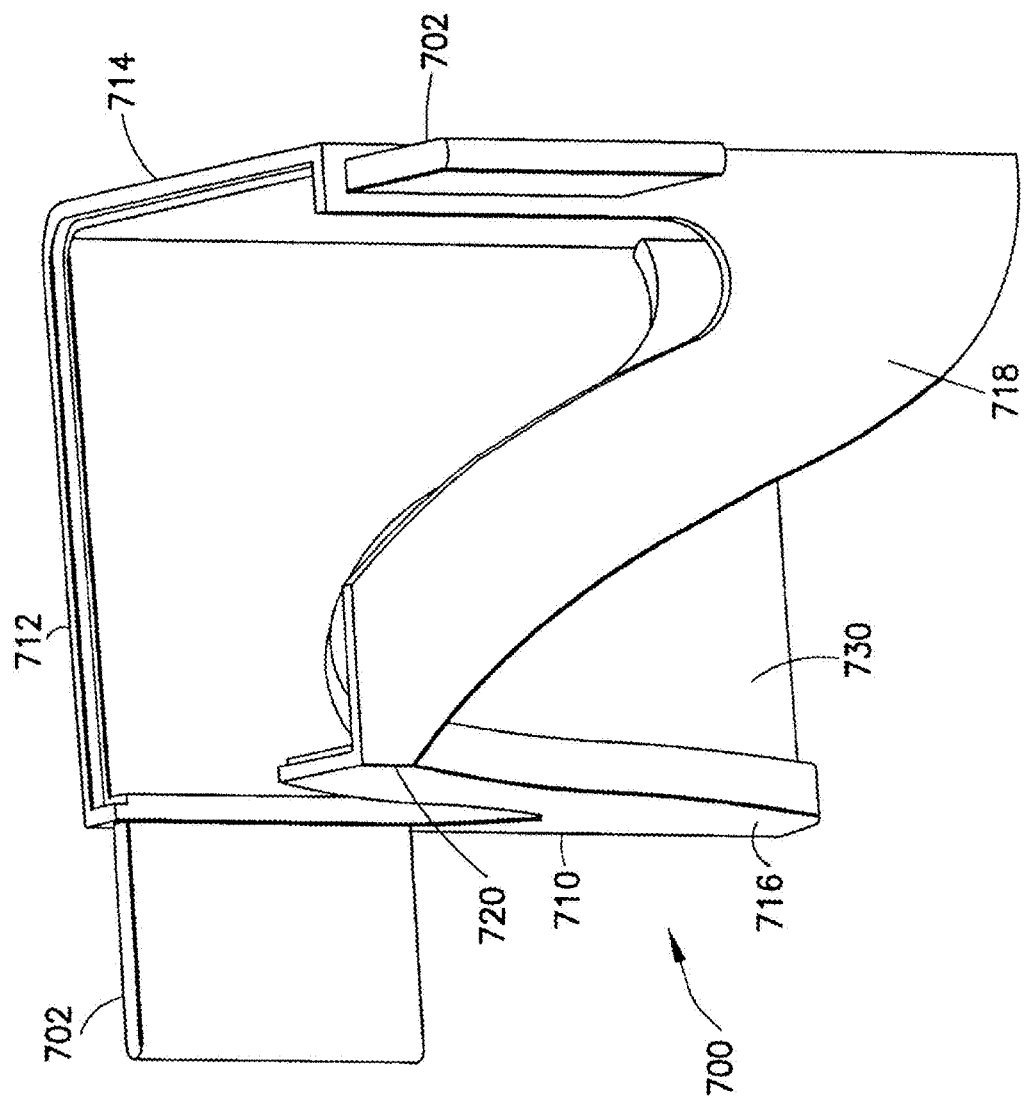
FIG. 7 depicts a corner piece in accordance with an embodiment of the present invention.

With reference to FIG. 7, inside corner piece 700 includes a main body 710 with a pair of tabs 702 extending therefrom. Main body 710 of inside corner piece 700 preferably includes a pair of wall surfaces 712 and 714 positioned substantially perpendicular to one another and designed to fit into a corner between two abutting wall surfaces. Main body 710 also preferably includes a pair of side walls 716, 718 that each extend substantially perpendicularly from a respective one of the wall surfaces 712, 714. Side walls 716, 718 are joined at corner 720. In the embodiment shown in FIG. 7, side walls 716 and 718 slope gradually upward from the bottom walls 712, 714, respectively, such that the side profile of the side walls 716, 718 generally match the side profile of a molding piece (not shown in FIG. 7). Decorative surface 730 is also preferably designed to match the look of the decorative surface of a molding piece.

Figure 8:
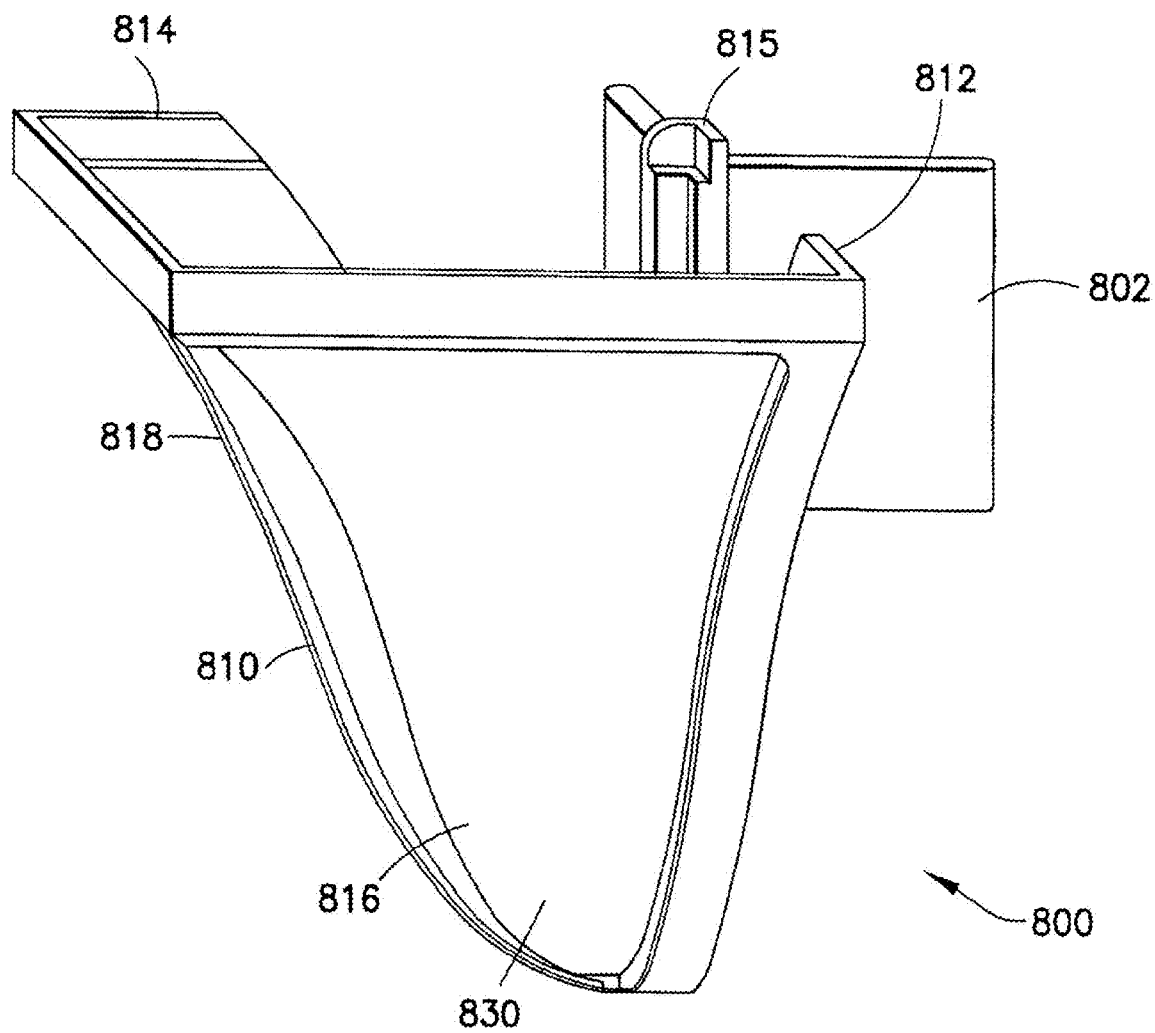
FIG. 8 depicts a corner piece in accordance with an embodiment of the present invention.
Figure 8A:
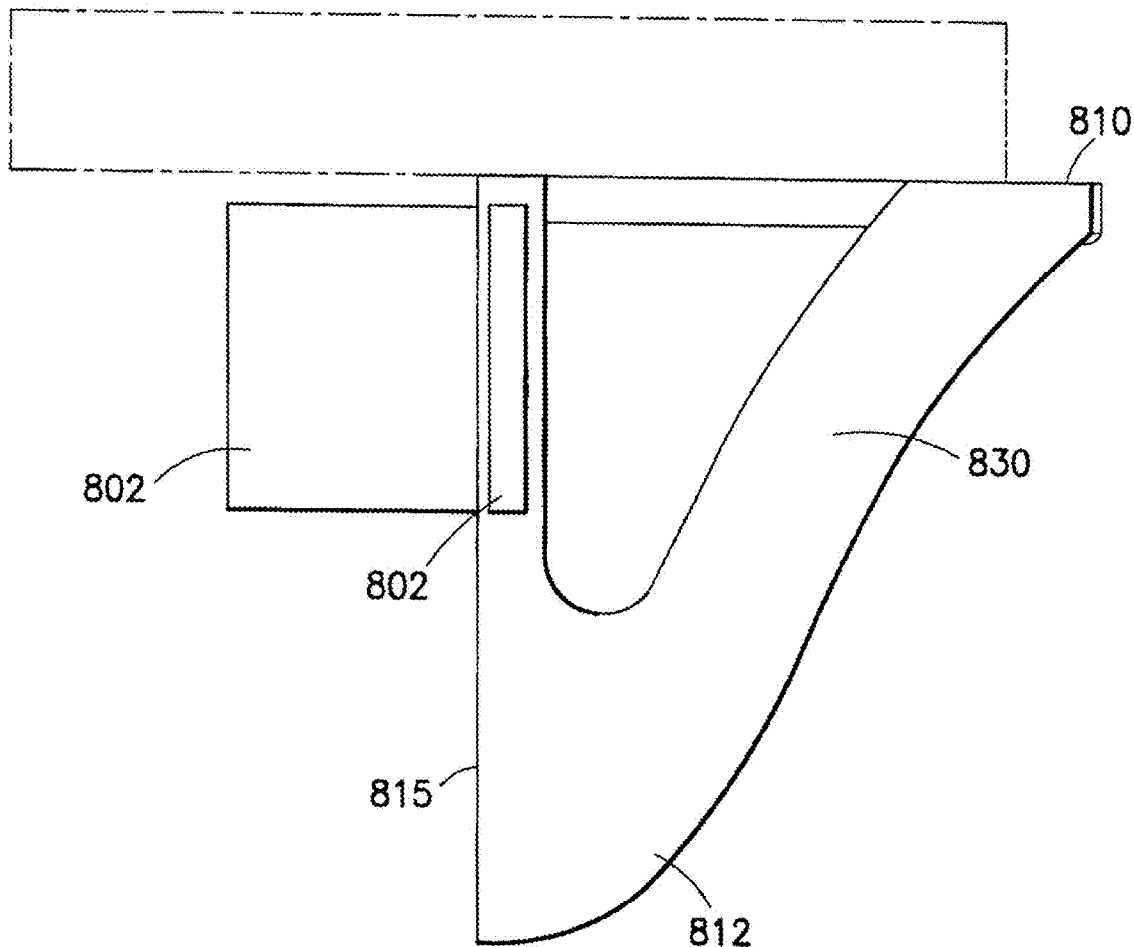
FIG. 8A depicts a side view of the corner piece of FIG. 8.

With reference to FIG. 8, outside corner piece 800 includes a main body 810 with a pair of tabs 802 extending therefrom. Main body 810 of inside corner piece 800 preferably includes a pair of wall surfaces 812 and 814 positioned substantially perpendicular to one another and meeting at spine 815. Wall surfaces 812 and 814 are designed to fit into a corner between two abutting wall surfaces. Main body 810 also preferably includes a pair of side walls 816, 818 that each extend substantially perpendicularly from a respective one of the wall surfaces 812, 814. Decorative surface 830 is also preferably designed to match the look of the decorative surface of a molding piece. FIG. 8A depicts a side view of outside corner piece 800 showing a preferred embodiment of wall surface 812

Figure 9:
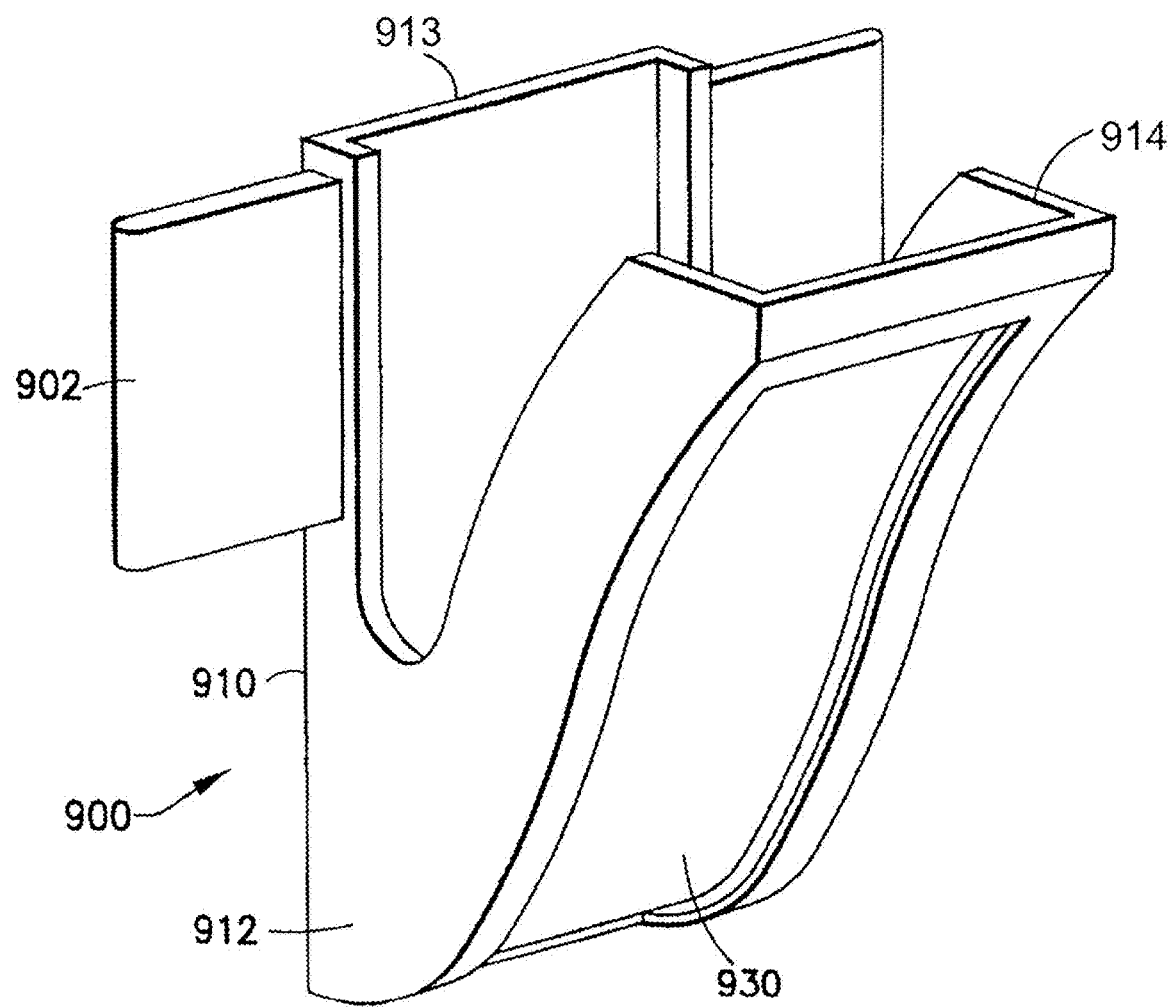
FIG. 9 depicts a connector piece in accordance with an embodiment of the present invention.

With reference to FIG. 9, connector piece 900 includes a main body 910 with a pair of tabs 902 extending therefrom. Main body 910 of connector piece 900 preferably includes a pair of side wall surfaces 912 and 914 positioned substantially parallel to one another and connected to an adjoining wall surface 913. In the embodiment shown in FIG. 9, side walls 912 and 914 slope gradually upward from the wall surface 913, such that the side profile of the side walls 912, 914 generally match the side profile of a molding piece (not shown in FIG. 9). Decorative surface 930, which preferable spans the outer edge of side walls 912, 914 is also preferably designed to match the look of the decorative surface of a molding piece.

The corner pieces are installed in the corners of the room where the corner piece can connect to the base piece 20 when installed on the wall. Each of the corner pieces preferably has a pair of flat tabs 702 and 802, respectively, that extend over base piece 20 when properly installed. Each of the corner pieces may then be secured to the corner of the room where the two walls meet, by either screwing, stapling, nailing or gluing the corner piece into the wall, or using any other known attachment means to attach the corner piece to the wall.

Figure 12:
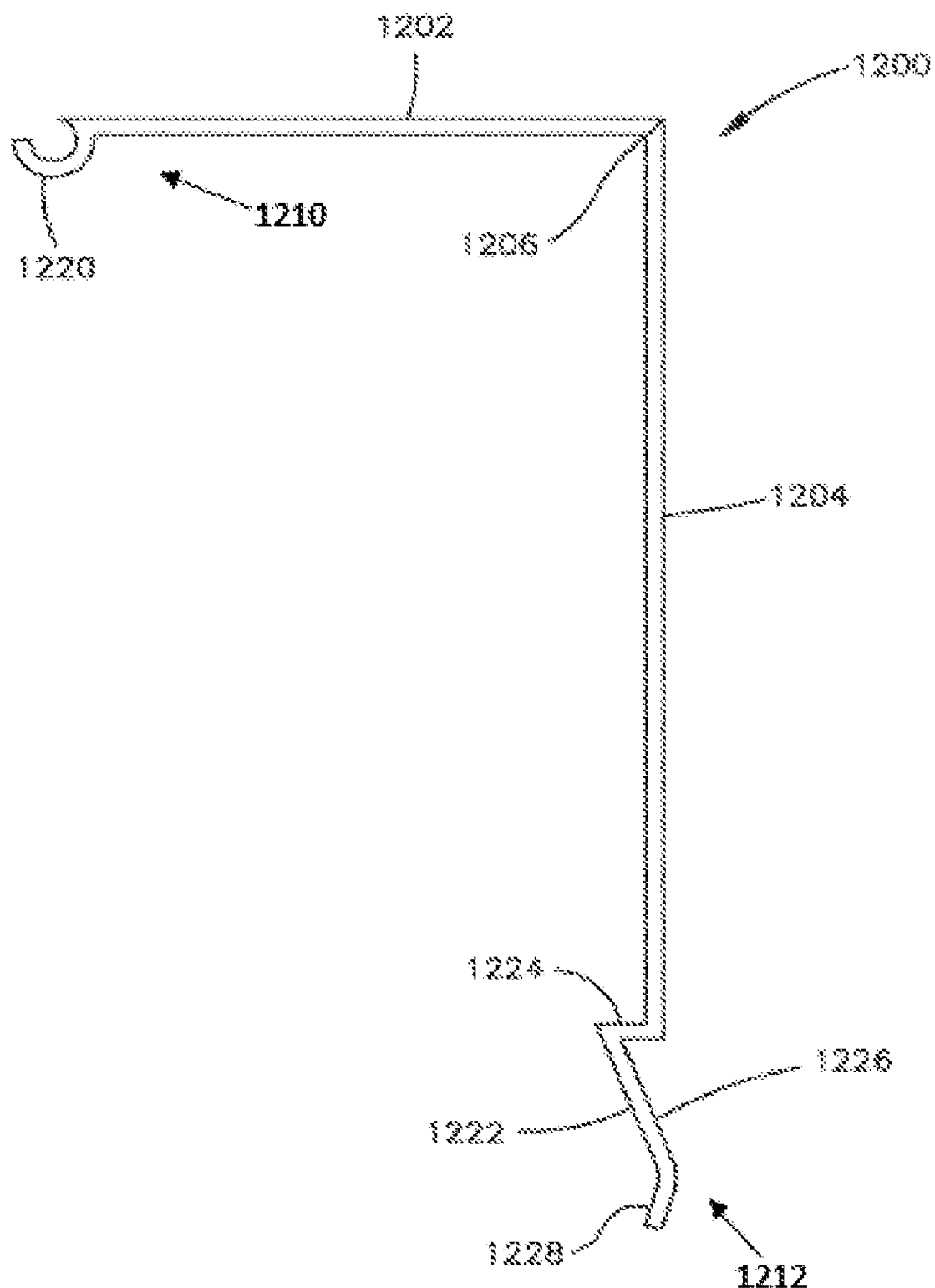
FIG. 12 depicts a base piece in accordance with an embodiment of the present invention.
Figure 13:
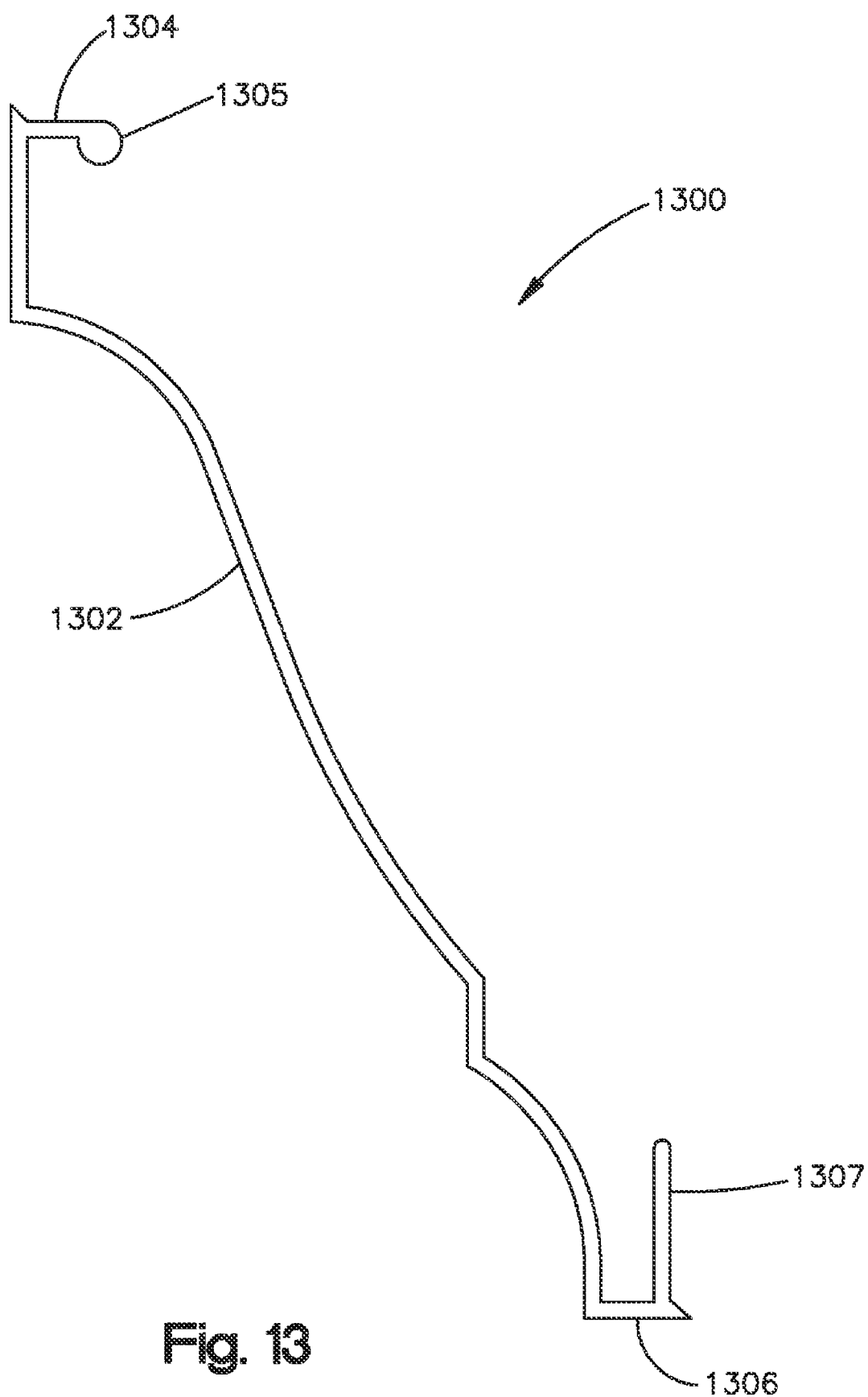
FIG. 13 depicts a crown piece in accordance with an embodiment of the present invention.
Figure 14:
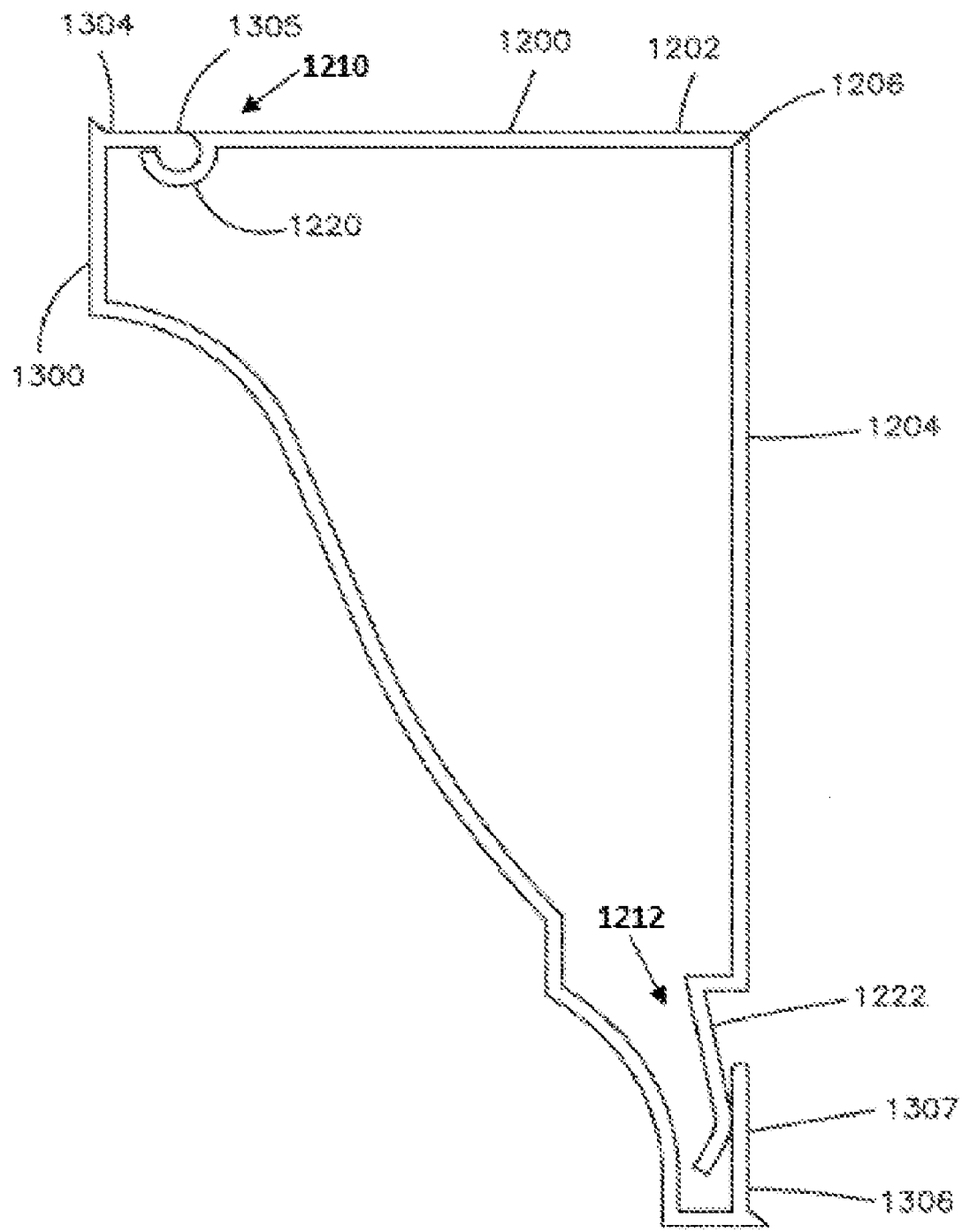
FIG. 14 depicts a base piece and a crown piece in mating engagement in accordance with an embodiment of the present invention.

With reference now to FIGS. 12-14, in yet another embodiment of the present invention, a decorative molding system and method of installation includes a pair of removably engagable molding components. Specifically, a base piece 1200 includes a run member 1202 hingeably connected to a rise member 1204 by a hinge 1206, such that an approximately 90-degree angle can be created between the run and rise members 1202, 1204. Each of the run and rise members 1202, 1204 include an engagement member 1210 and 1212 at their respective ends. The base piece 1200 is mounted to vertical wall (not shown) and ceiling surfaces (not shown) by attaching the run member 1202 to the ceiling and the rise member 1204 to the wall, such that the hinge portion 1206 connecting the run and rise members 1202, 1204 sits approximately in the intersection between the vertical wall and ceiling. However, as shown and described elsewhere in this application, the base piece 1200 may be moved a distance away from the ceiling to create a desired artistic effect.

As shown in FIG. 12, in a preferred embodiment of the presently described embodiment, run member 1202 includes a hook portion 1220 at an end thereof at a position away from the hinge portion 1206. In said preferred embodiment, rise member 1204 includes a tension clasp member 1222 at an end thereof at a position away from the hinge portion 1206. The tension clasp member 1222 preferably includes a first clearance portion 1224 extending an angle of approximately 90-degrees from an end of the rise member 1204 and away from where the wall would abut one of the surfaces 1204a of the rise member 1204. A clasp portion 1226 extends in a direction generally away from the hinge 1206 and is preferably formed at an internal angle of 79-degrees relative to the first clearance portion 1224. At an end of the clasp portion 1226, a second clearance portion 1228 extends in a direction generally away from the hinge 1206 and is preferably formed at an internal angle of 124-degrees relative to the clasp portion 1226.

In the preferred embodiment being discussed, the dimensions of the base piece 1200 may be as follows: approximate thickness of 1 mm; run member 1202 length of approximately 48.614 mm; rise member 1204 length of approximately 73 mm (excluding the tension clasp member 1222); and an overall length of tension clasp member 1222 of 16.502 mm. First clearance portion 1224 may preferably have a length of 2.958 mm. Persons of skill in the art will recognize that the aforementioned dimensions may be modified to suit a particular design choice (e.g., the base piece may be made larger or smaller to suit a particular molding size).

With reference now to FIG. 13, a crown molding piece 1300 having a decorative surface 1302 generally of a profile known in the art for crown moldings includes upper and lower engagement surfaces 1304, 1306. The upper engagement surface 1304 preferably includes a protrusion 1305 for engagement with an hook portion 1220 on the run member 1202 of the base piece 1200. The lower engagement surface 1306 of the crown piece 1300 preferably includes a tab member 1307 extending substantially vertically (relative to when the crown piece 1300 is engaged with a base piece, see FIG. 14) for engagement with a tension clasp member 1222 of the rise member 1204 of the base piece 1200. In this way, the crown molding piece 1300 can be removably engaged to the base piece 1200 to give an appearance similar to traditional crown molding, but with an ease of installation unavailable with traditional crown molding.

In the preferred embodiment being discussed, the dimensions of the crown piece 1300 may be as follows: approximate thickness of 1 mm; total length of crown piece (top to bottom) approximately 98 mm; length of upper engagement portion 1304 (including protrusion 1305) approximately 5.5 mm; and length of tab member 1307 of 17 mm. Persons of skill in the art will recognize that the aforementioned dimensions may be modified to suit a particular design choice (e.g., the base piece may be made larger or smaller to suit a particular molding size).

It will also be understood that the relative overall lengths of the base and crown pieces 1200, 1300 and the respective engagement portions thereof must be of sufficient relative sizes so that the engagement portions can mate as described below in connection with FIG. 14. For example, in the preferred embodiments described above, the overall length of the rise member 1204 of base piece 1200 is 92.502 mm, whereas the overall height of the crown piece 1300 is 98 mm. With the upper engagement portions 1220, 1304 mated, this means that the clasp member 1222 will overlap with the tab member 1307 by approximately 8.502 mm.

With reference now to FIG. 14, there is shown a preferred embodiment of base and crown pieces 1200, 1300 mated together as if installed on a wall (not shown). In one preferred embodiment of installation the rise member 1204 of base piece 1200 is affixed to a wall (and in some applications the run member 1202 is also affixed to a ceiling). Once the base piece 1200 is affixed to at least a wall, the crown piece 1300 may be engaged therewith by, in a preferred embodiment, pushing the tab member 1307 underneath the tension clasp member 1222, and then snapping the protrusion 1305 into the hook 1220. To remove the crown piece 1300, the tab member 1307 may be slid out from underneath the tension clasp member 1222, and then the protrusion 1305 may be unsnapped from the hook 1220.

With reference now to FIGS. 15-20, in an alternate embodiment of a corner piece 1500 and a connector piece 1800, the pieces 1500, 1800 are provided with tabs inwardly offset from a back wall of the corner piece. Additionally, additional material is provided at a lower portion of the back wall of the corner piece to permit custom adjustment of the corner piece to fit in a corner that is not exactly 90-degrees. In a preferred embodiment, the additional material is configured as a pair of wings extending outwardly at an approximately 5-degree angle from the back corner of the corner piece. This preferred configuration permits a corner piece to be adapted to a corner that has an angle that is greater than 90-degrees, but less than approximately 100-degrees. Persons of skill in the art will recognize that these angles can be adjusted to meet certain design criteria.

Figure 15:
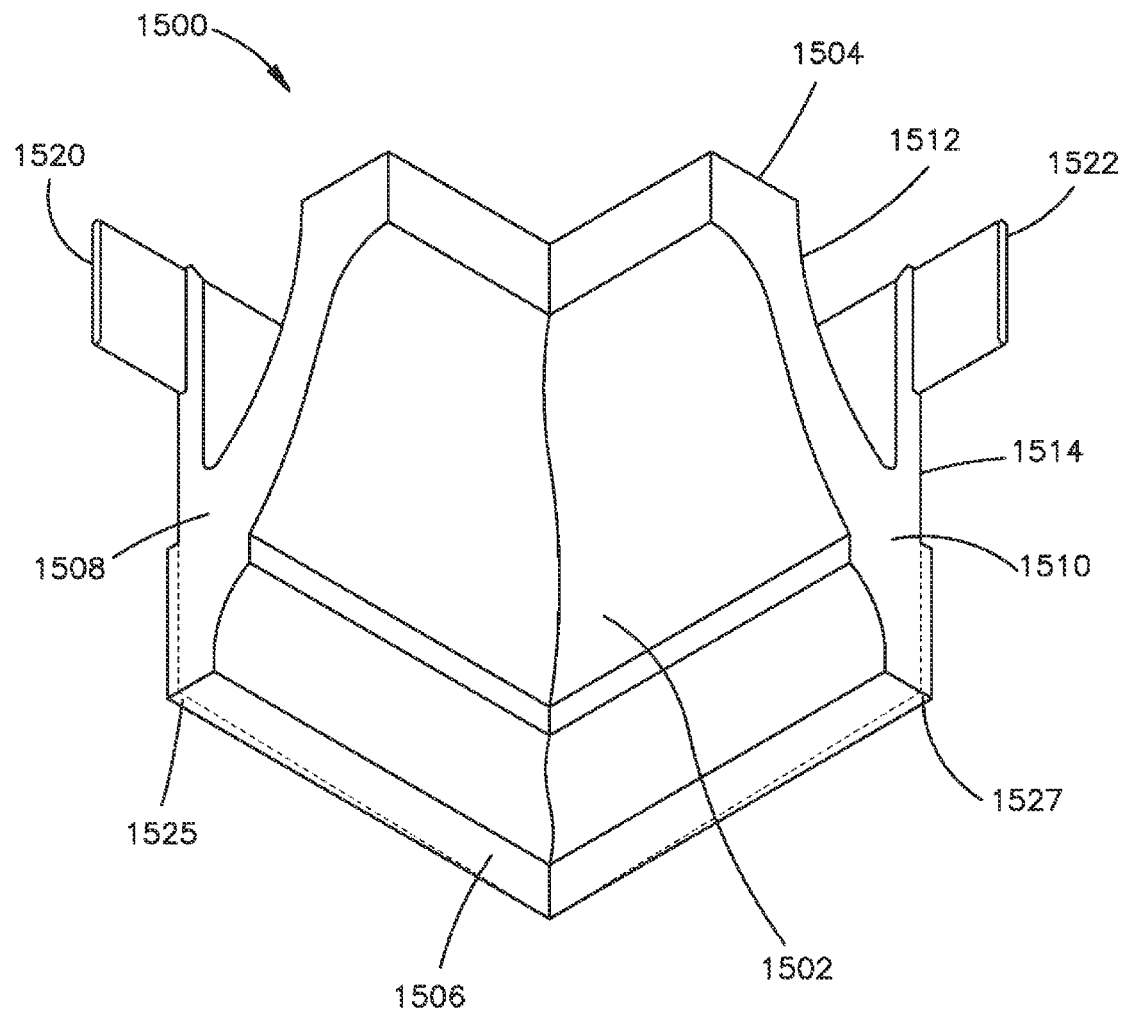
FIGS. 15-17 depict an inside corner piece in accordance with an embodiment of the present invention.
Figure 16:
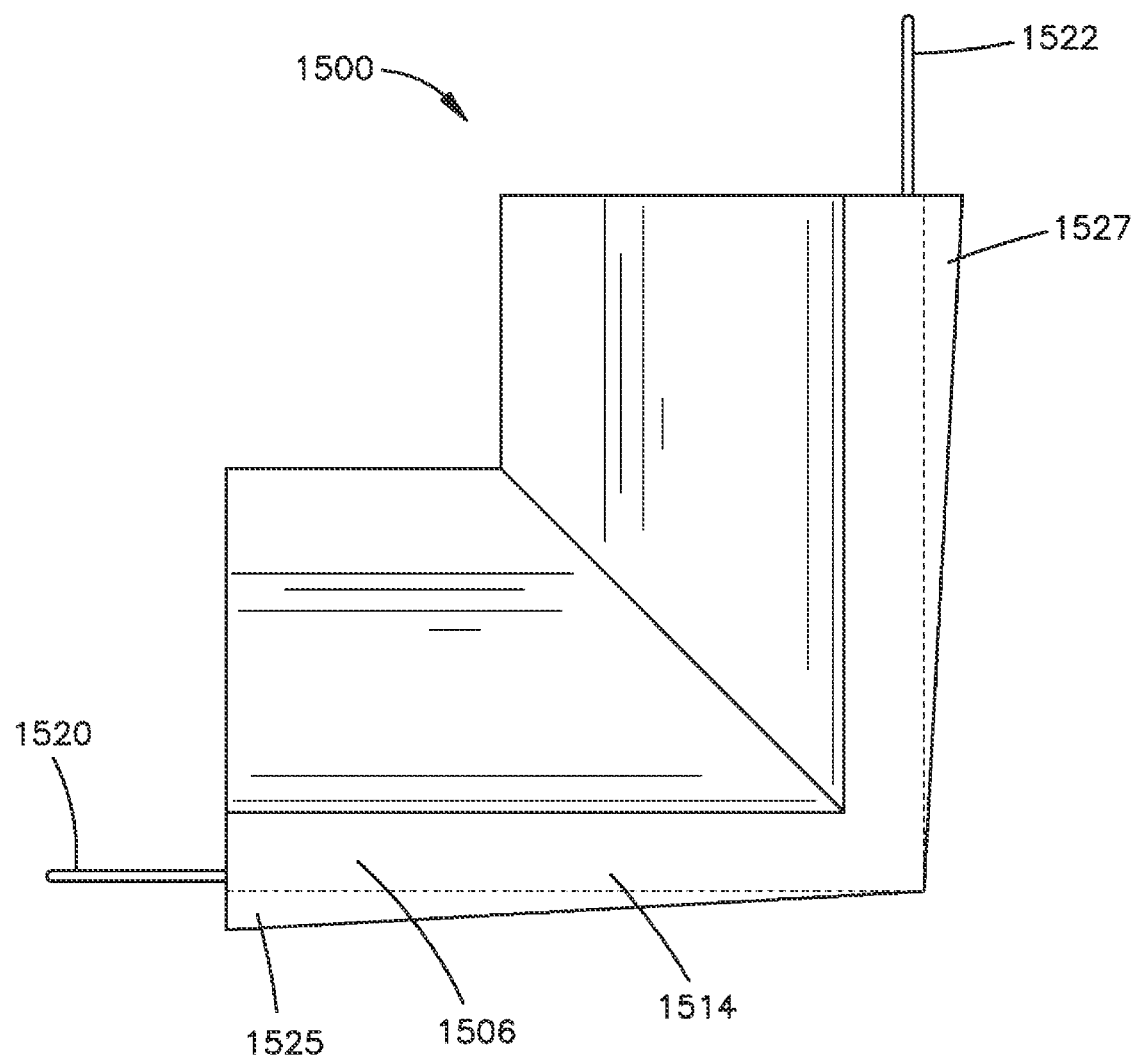
Figure 17:
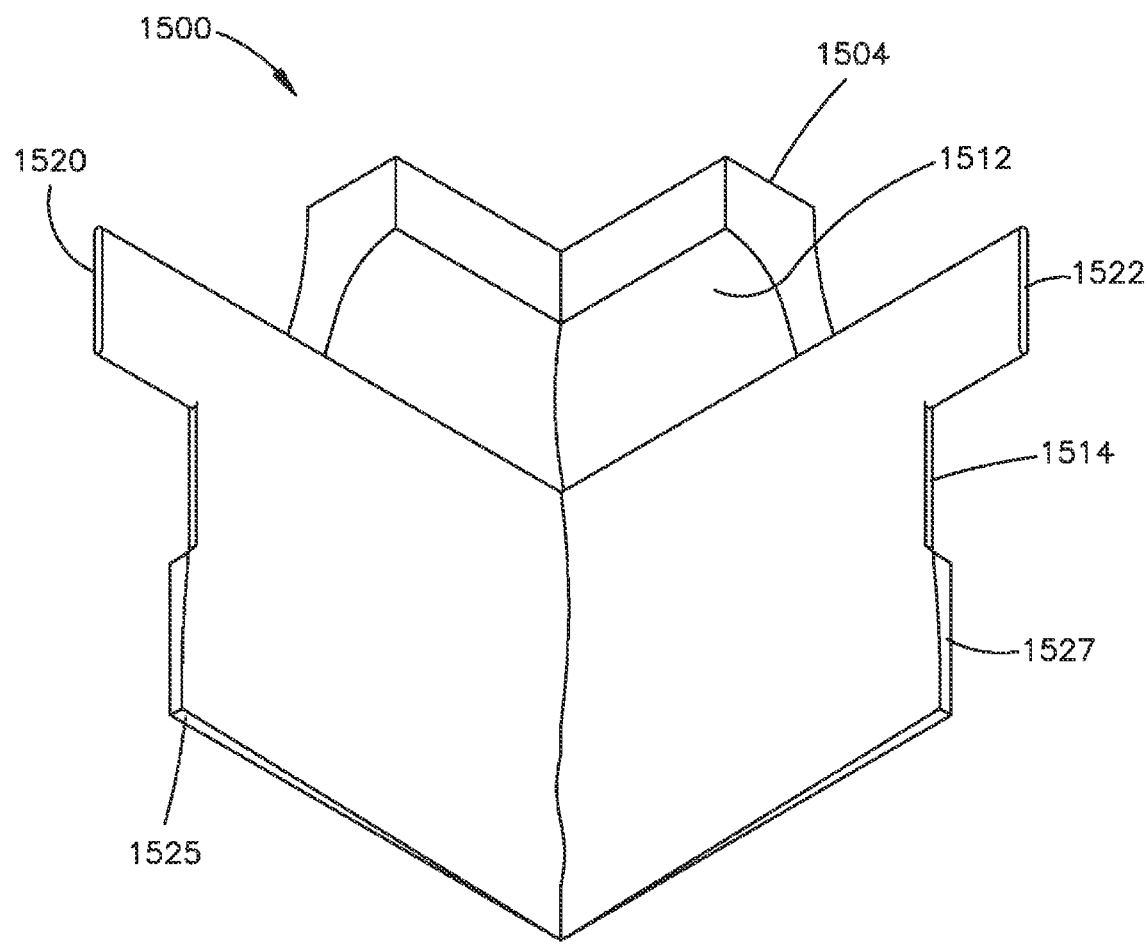

Referring specifically to FIGS. 15-17, an inside corner piece 1500 includes a façade 1502 with a top surface 1504, a bottom surface 1506, and a pair of side surfaces 1508, 1510. An inner surface 1512 of the façade 1502, which will face a wall when mounted, includes a rear wall 1514, which is connected to a lower portion of the inner surface 1512 and extends substantially vertically towards the top surface 1504 of the façade 1502. In a preferred embodiment, the height of the top surface 1504 of the façade 1502 is higher that the height of the top of the rear wall 1514. This advantageously permits the corner piece 1500 to be mounted flush to a ceiling when the ceiling is not completely flat or extends away from a wall at an angle other than exactly 90-degrees.

A pair of tabs 1520, 1522 extend outwardly from each side the rear wall 1514. In a preferred embodiment, each of the tabs 1520, 1522 is inwardly offset from a back surface of the rear wall 1514. This feature can best be seen in FIG. 16. In addition, in a preferred embodiment, a pair of wings 1525, 1527 are formed near a bottom surface of the rear wall 1514. It is preferred that wings 1525, 1527 comprise additional material provided on the wall-facing surface of the rear wall 1514 and that the additional material builds from a back corner of the rear wall 1514 to each of the sides of the rear wall 1514 at approximately a 5-degree angle. In this way, material can be cut or shaved off of the wings 1525, 1527 by an installer to adjust for a snug fit when a wall corner has an angle that is greater than 90-degrees, but less than approximately 100-degrees. Again, persons of skill in the art will recognize that these angles can be adjusted to meet certain design criteria.

Figure 18:
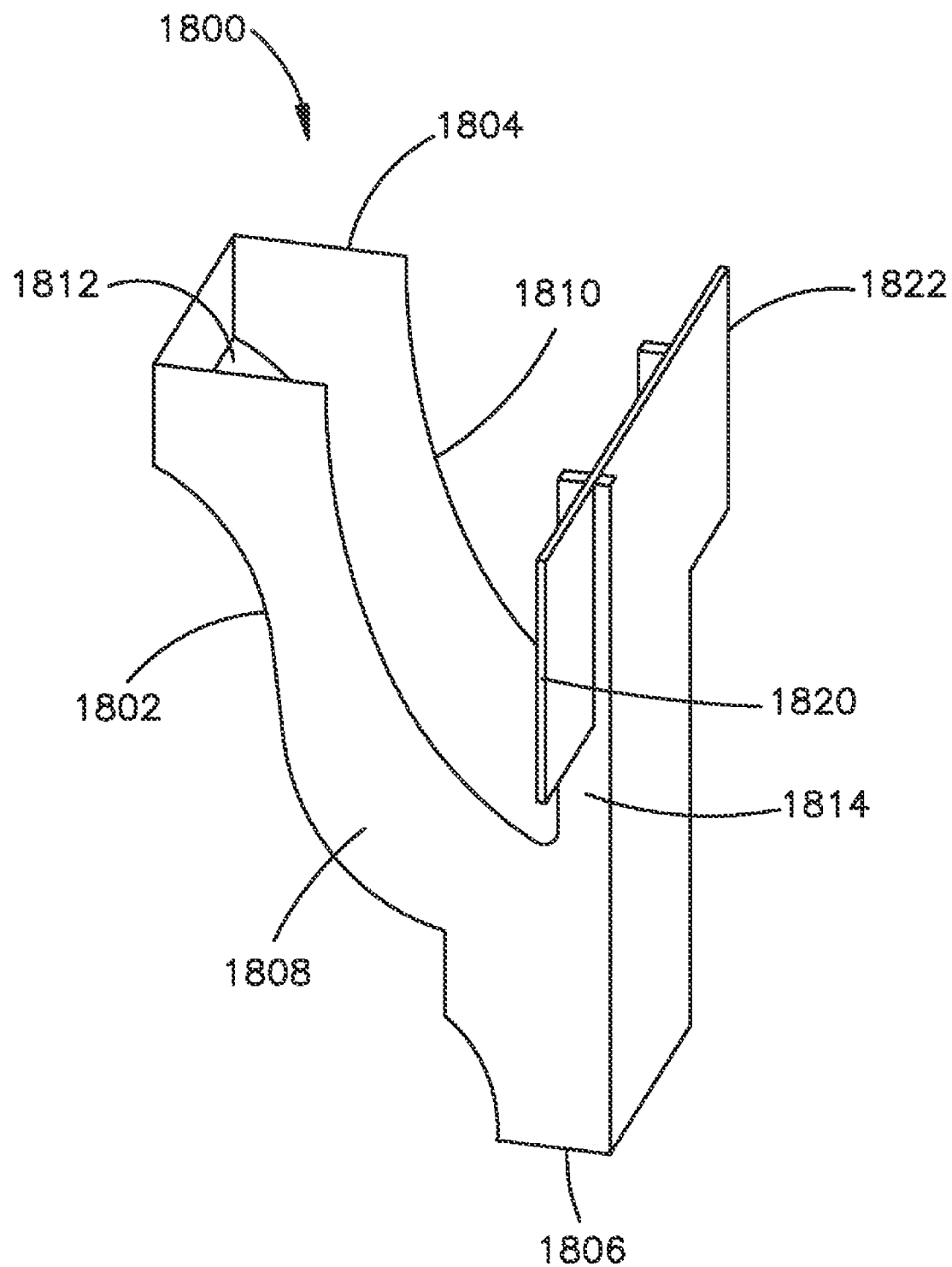
FIGS. 18-19 depict a connector piece in accordance with an embodiment of the present invention.
Figure 19:
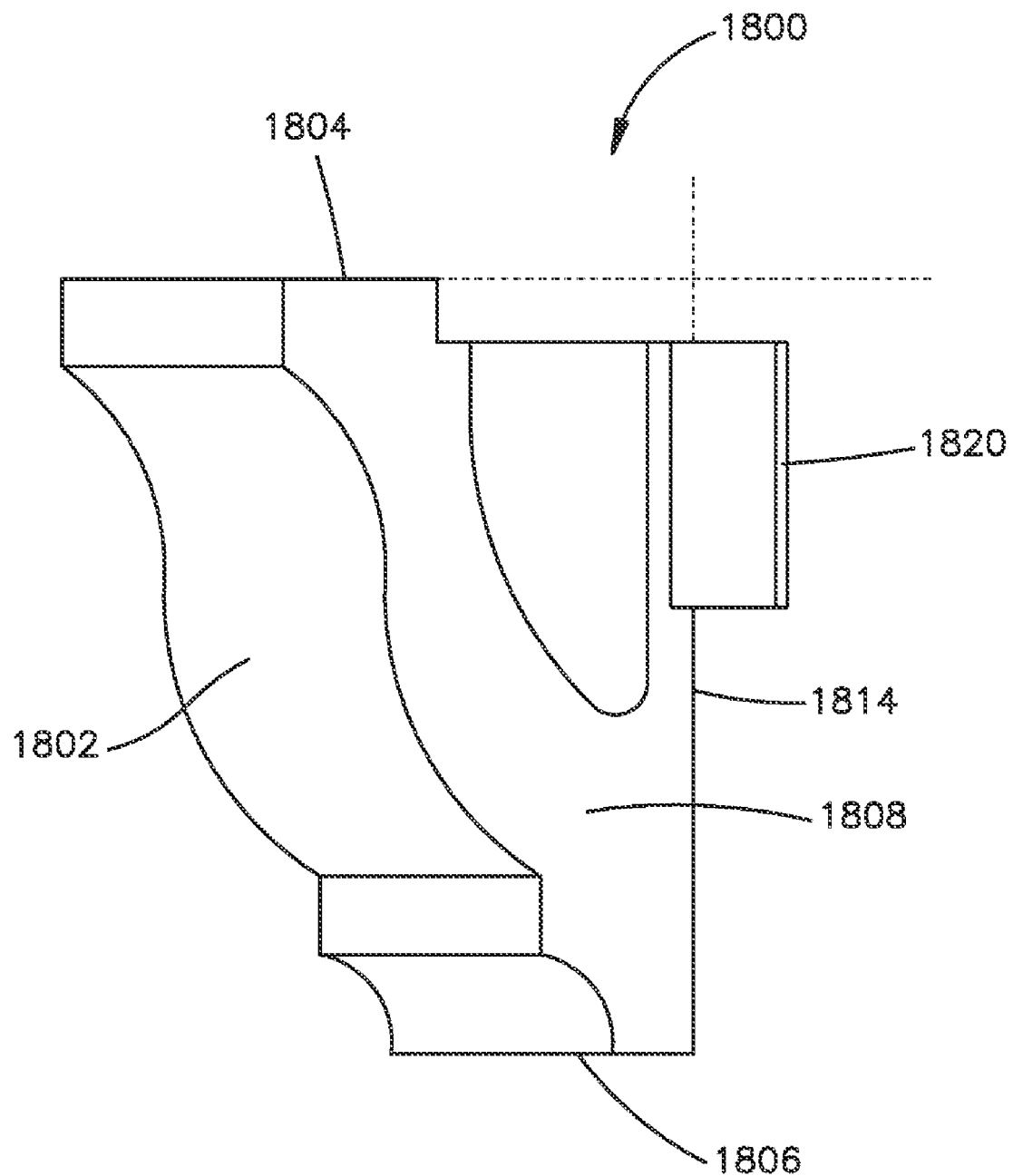

With reference now to FIGS. 18-19, an alternate preferred embodiment of a connector piece 1800 is shown. A connector piece 1800 includes a façade 1802 with a top surface 1804, a bottom surface 1806, and a pair of side surfaces 1808, 1810. An inner surface 1812 of the façade 1802, which will face a wall when mounted, includes a rear wall 1814, which is connected to a lower portion of the inner surface 1812 and extends substantially vertically towards the top surface 1804 of the façade 1802. In a preferred embodiment, the height of the top surface 1804 of the façade 1802 is higher that the height of the top of the rear wall 1814. This advantageously permits the connector piece 1800 to be mounted flush to a ceiling when the ceiling is not completely flat or extends away from a wall at an angle other than exactly 90-degrees. A pair of tabs 1820, 1822 extend outwardly from each side the rear wall 1814. In a preferred embodiment, each of the tabs 1820, 1822 is inwardly offset from a back surface of the rear wall 1814. This feature can best be seen in FIG. 18.

Figure 20:
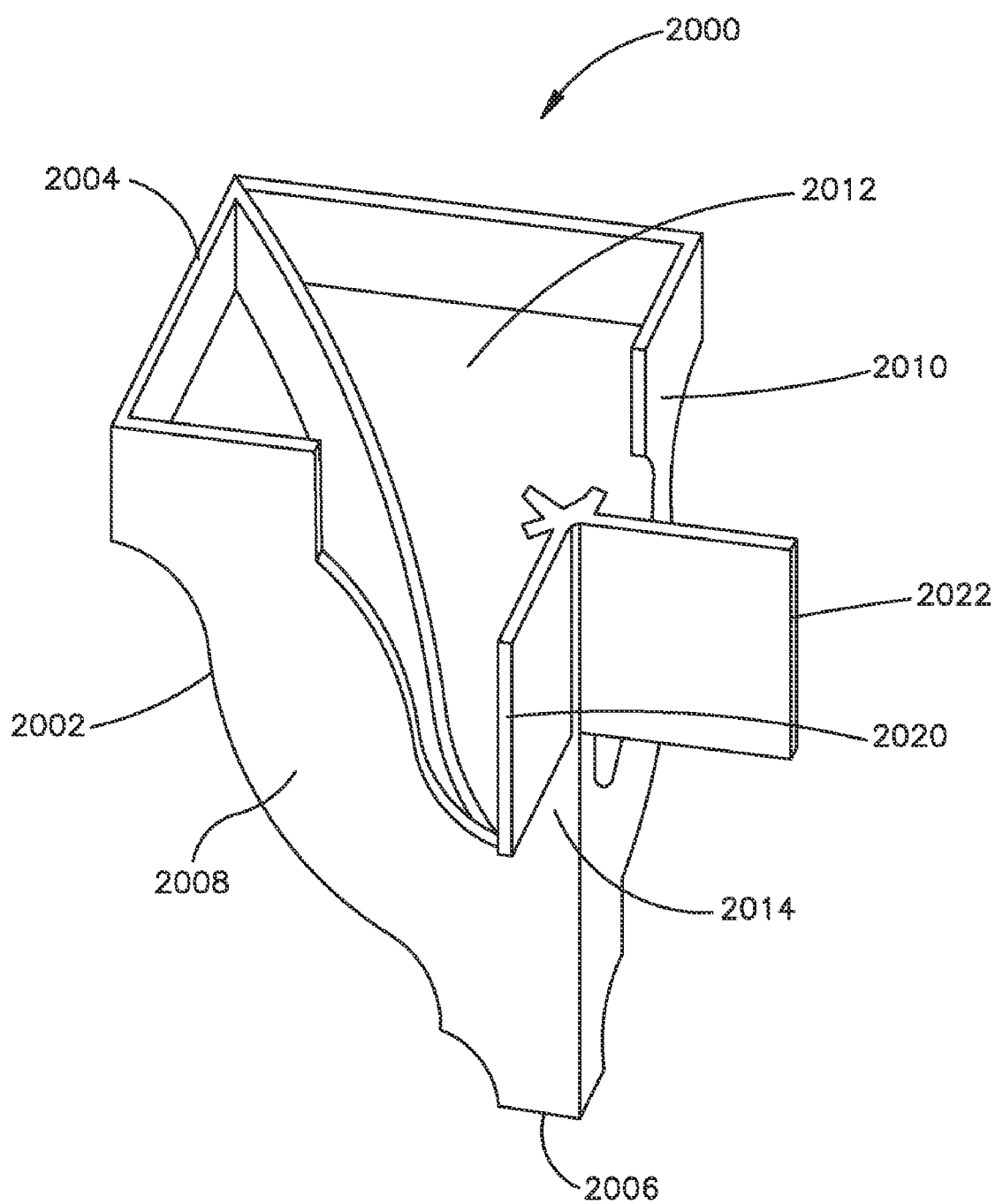
FIG. 20 depicts an outside corner piece in accordance with an embodiment of the present invention.

With reference now to FIG. 20, an alternate preferred embodiment of an outside corner piece 2000 is shown. An outside corner piece 2000 includes a façade 2002 with a top surface 2004, a bottom surface 2006, and a pair of side surfaces 2008, 2010. An inner surface 2012 of the façade 2002, which will face a wall when mounted, includes a rear wall 2014, which is connected to a lower portion of the inner surface 2012 and extends substantially vertically towards the top surface 2004 of the façade 2002. In a preferred embodiment, the height of the top surface 2004 of the façade 2002 is higher that the height of the top of the rear wall 2014. This advantageously permits the connector piece 2000 to be mounted flush to a ceiling when the ceiling is not completely flat or extends away from a wall at an angle other than exactly 90-degrees. A pair of tabs 2020, 2022 extend outwardly from each side the rear wall 2014. In a preferred embodiment, each of the tabs 2020, 2022 is inwardly offset from a back surface of the rear wall 2014.

Figure 4:
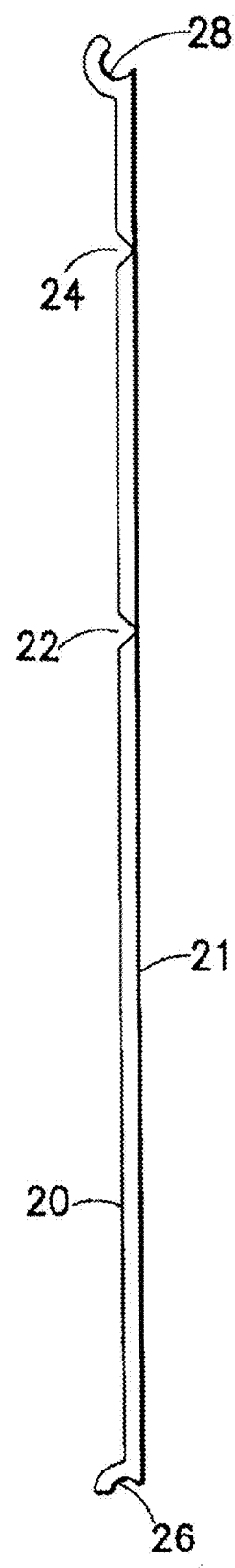
FIG. 4 depicts a base piece of FIG. 3 in accordance with an embodiment of the present invention.

In order to properly install the crown molding, an installer measures the distance between the two corners in the room and cuts a base piece 20 as shown in FIG. 4 to the desired length. Next, the base piece 20 is crimped along its hinge (as shown in FIG. 3) to be slid into the corner created between the ceiling and the wall. The base piece need not be bent to a full ninety-degree angle, and a more obtuse angle, such as 110-degrees may be sufficient, although the dimensions of the location being where the molding is being installed can be a factor. Using the hinge 24, the base piece 20 sits tightly against the wall where it is stapled or screwed into place using known attachment mechanisms. Once the base piece 20 has been installed and secured, the corner pieces 702 and 802 are secured at either end of the base piece 20. A strip of crown piece 18 is cut to match the size of length the base piece 20 between the respective corner pieces 702, 802, and the crown piece 18 is snapped onto the base piece 20 using attachment devices 12 and 14 which connect to attachment devices 26 and 28 respectively on the base piece. Of course, persons of skill in the art will recognize that these techniques may be adapted to install the crown moldings shown and described in connection with FIGS. 12-20.

Figure 10:
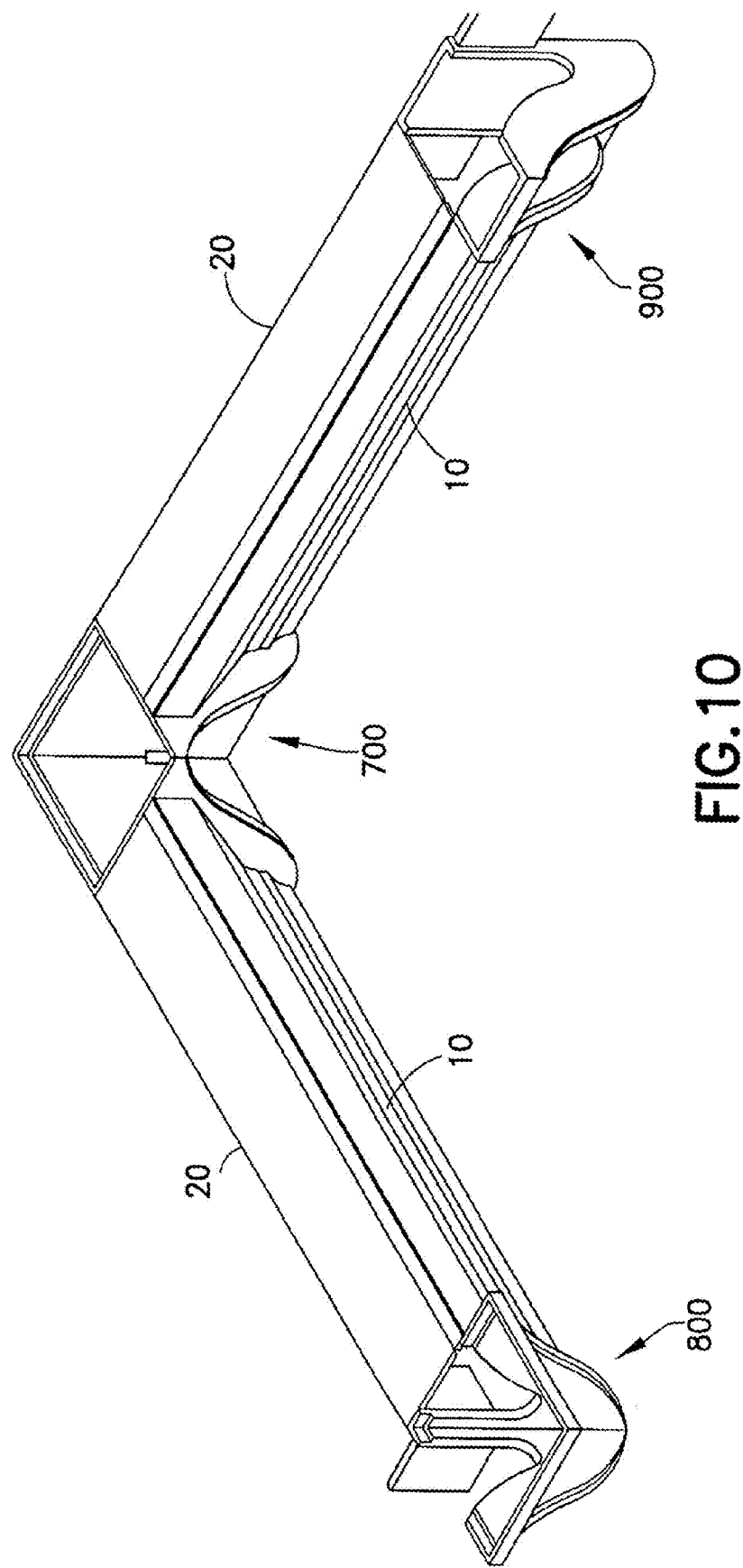
FIG. 10 depicts a system in accordance with an embodiment of the present invention.
Figure 11:
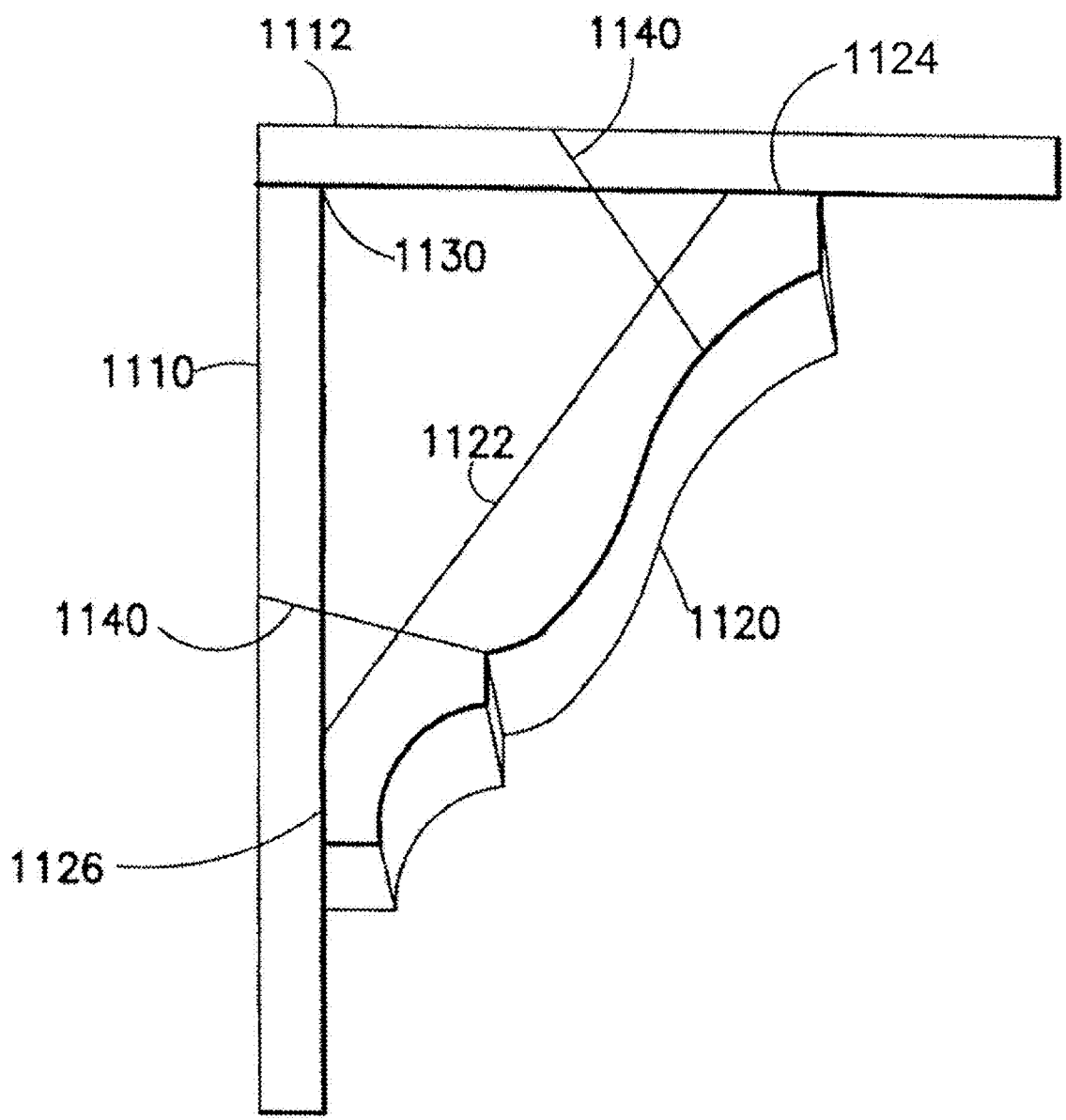
FIG. 11 depicts a prior art crown molding arrangement.

In an embodiment of the present invention, a connector piece 900 as shown in FIG. 9 can be installed at the end of the molding to additionally secure the base piece 20 to the crown piece 10. FIG. 10 shows a fully installed crown molding showing the outside corner piece, the connected crown molding including base piece 20 and crown piece 10, the inside corner piece 700 and the connector piece 900. In the situation where an installer wants to install the crown molding below the ceiling mount, measurements should first be taken below the ceiling mount to establish the correct placing for the securing of the base piece 20 and the corner pieces 700 and 800 (and the connector piece 900) and the same installation process described above is used at the location below the ceiling mount that he or she wishes to install the molding.

Those skilled in the art will recognize that the method and system of the present invention has many applications, may be implemented in many manners and, as such is not to be limited by the foregoing exemplary embodiments and examples. While the preferred embodiments have been described and illustrated it will be understood that changes in details and obvious variations might be made without department from the spirit and principle of the invention and therefore the scope of the invention is not to be construed as limited to the preferred embodiment. In this regard, any number of the features of the different embodiments described herein may be combined into one single embodiment and alternate embodiments having fewer than or more than all of the features herein described are possible. Moreover, the scope of the present invention covers conventionally known and features of those variations and modifications through the system and components described herein as would be understood by those skilled in the art. It is the intention, therefore, to be limited only as indicated by the scope of the claims appended hereto.

It is also to be understood that the following claims are intended to cover all of the generic and specific features of the invention herein described and all statements of the scope of the invention that, as a matter of language, might be said to fall therebetween.

The invention claimed is:

1. A crown molding system comprising:
a base piece including a rise portion and a run portion connected via a hinge, the run portion of the base piece including a first base piece engagement portion along at least a portion of a length of a front edge of the run portion, and the rise portion of the base piece including a second base piece engagement portion along at least a portion of a length of a bottom edge of the rise portion;
a crown piece including a decorative surface and a first crown engagement portion along at least a portion of a length of a top edge of the crown piece and a second crown engagement device along at least a portion of a length of a bottom edge of the crown piece;
wherein at least the rise portion of the base piece is mounted on a wall and the run portion is rotated about an axis passing through the hinge to an angle substantially perpendicular to the rise portion and the wall and the crown piece is selectively removably engageable with the base piece via engagement of the first base engagement portion with the first crown engagement portion and engagement of the second base engagement portion with the second crown engagement portion; and wherein the hinge includes a pair of angled faces, such that when the rise and run portions of the base piece are rotated to a substantially 90-degree angle the pair of angled faces of the hinge are in abutting relationship.

2. The crown molding system of claim 1, wherein the base piece and crown piece are made of a PVC material.

3. The crown molding system of claim 1, wherein the base piece further comprises a second hinge located on the run portion of the base piece.

4. The crown molding system of claim 1, further comprising an inside corner piece mountable in an inside corner of two abutting walls, the inside corner piece including a pair of outwardly extending tabs for securing the inside corner piece to each of the two abutting walls and a decorative surface.

5. The crown molding system of claim 4, wherein:
the inside corner piece includes:
a first raised portion;
a second raised portion; and
additional material protruding from at least one of the first raised portion and second raised portion to permit the inside corner piece to be adapted to corners of varying angles.

6. The crown molding system of claim 4, wherein:
the inside corner piece includes:
a first raised portion;
a second raised portion substantially perpendicular to the first raised portion; and
a first wing and a second wing, wherein the first wing protrudes from the first raised portion and the second wing protrudes from the second raised portion, to permit the inside corner piece to be adapted to corners of varying angles.

7. The crown molding system of claim 6 wherein:
the first wing extends outwardly at about 5 degrees relative to the first raised portion; and
the second wing extends outwardly at about 5 degrees relative to the second raised portion.

8. The crown molding system of claim 1, further comprising an outside corner piece mountable in an outside corner of two abutting walls, the outside corner piece including a pair of outwardly extending tabs for securing the outside corner piece to each of the two abutting walls and a decorative surface.

9. The crown molding system of claim 1, further comprising a connector piece mountable on a surface of a wall between two sets of base pieces and crown pieces, the connector piece including a pair of outwardly extending tabs for securing the connector piece to wall and a decorative surface.

10. The crown molding system of claim 1, wherein the first and second base engagement portions are socket-type connectors and the first and second crown engagement portions are ball-type connectors.

11. The crown molding system of claim 1, wherein the run portion of the base piece includes at least one opening.

12. The crown molding system of claim 11, wherein the at least one opening includes a light reflective insert.

* * * * *

UNITED STATES PATENT AND TRADEMARK OFFICE
CERTIFICATE OF CORRECTION

PATENT NO. : 7,958,685 B2
APPLICATION NO. : 12/559629
DATED : June 14, 2011
INVENTOR(S) : Todd Rowohit Page 1 of 1

It is certified that error appears in the above-identified patent and that said Letters Patent is hereby corrected as shown below:

Title page:

add item [63] as follows:

--[63]   Related U.S. Application Data

Continuation-in-part of application No. 11/800,269 filed on May 3, 2007, now abandoned, which claims benefit of Provisional Application No. 60/797,500 filed on May 4, 2006.--

Signed and Sealed this
Third Day of January, 2012

David J. Kappos
*Director of the United States Patent and Trademark Office*